US012736674B2

(12) United States Patent
Masuda et al.

(10) Patent No.: US 12,736,674 B2
(45) Date of Patent: Sep. 15, 2026

(54) LASER DRIVE DEVICE, SENSING MODULE, AND TIMING ADJUSTMENT METHOD

(71) Applicant: SONY SEMICONDUCTOR SOLUTIONS CORPORATION, Kanagawa (JP)

(72) Inventors: Takashi Masuda, Kanagawa (JP); Mitsushi Tabata, Kanagawa (JP); Koichi Okamoto, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 1265 days.

(21) Appl. No.: 17/627,902

(22) PCT Filed: Jun. 12, 2020

(86) PCT No.: PCT/JP2020/023243
§ 371 (c)(1),
(2) Date: Jan. 18, 2022

(87) PCT Pub. No.: WO2021/019933
PCT Pub. Date: Feb. 4, 2021

(65) Prior Publication Data

US 2022/0276381 A1 Sep. 1, 2022

(30) Foreign Application Priority Data

Jul. 30, 2019 (JP) ................................ 2019-139610

(51) Int. Cl.
*G01S 17/26* (2020.01)
*G01S 7/484* (2006.01)
(Continued)

(52) U.S. Cl.
CPC .............. *G01S 17/26* (2020.01); *G01S 7/484* (2013.01); *G01S 7/4863* (2013.01); *G01S 7/4865* (2013.01)

(58) Field of Classification Search
CPC ...... G01S 7/484; G01S 7/4863; G01S 7/4865; H10S 5/0428; H10S 5/062; H04N 23/60; H03K 5/12; H01S 5/183
See application file for complete search history.

(56) References Cited

U.S. PATENT DOCUMENTS 11,240,894 B2 * 2/2022 Oka ........................ G01S 17/08
2002/0036630 A1 * 3/2002 Sakura ................ H04B 10/508 345/204
(Continued)

FOREIGN PATENT DOCUMENTS

CN 1347161 A 5/2002
CN 1822455 A 8/2006
(Continued)

OTHER PUBLICATIONS

Tanimoto_English (Year: 2001).*
(Continued)

*Primary Examiner* — Minsun O Harvey
*Assistant Examiner* — Alexander Ehrlich
(74) *Attorney, Agent, or Firm* — CHIP LAW GROUP

(57) ABSTRACT

Provided is a laser drive device including a drive circuit that drives a light emitting element by a vertical cavity surface emitting laser to emit light on the basis of a drive control signal, an assist circuit that short-circuits both ends of the light emitting element on the basis of an assist control signal to speed up a fall time of the light emitting element, a timing adjustment unit that performs mutual timing adjustment between the drive control signal and the assist control signal on the basis of a timing adjustment signal, a phase detection
(Continued)

unit that detects a phase difference between the drive control signal and the assist control signal, and a timing control unit that generates the timing adjustment signal on the basis of a phase difference detection result of the phase detection unit.

12 Claims, 23 Drawing Sheets

(51) Int. Cl.
*G01S 7/4863* (2020.01)
*G01S 7/4865* (2020.01)

(56) References Cited

U.S. PATENT DOCUMENTS

2006/0133435 A1 6/2006 Ikeda
2010/0074283 A1* 3/2010 Ikegami .................. H01S 5/042
372/24
2020/0185875 A1* 6/2020 Allouche .............. H01S 5/0428
2020/0363506 A1* 11/2020 Shen ........................ G01S 7/497
2021/0141069 A1* 5/2021 Shimizu .................. G01S 7/497

FOREIGN PATENT DOCUMENTS

CN 110651199 A 1/2020
EP 1195925 A2 4/2002
JP 2001345691 A * 12/2001
JP 2002-101047 A 4/2002
JP 2008-098657 A 4/2008
JP 2009-236650 A 10/2009
KR 10-2002-0024772 A 4/2002
WO 2018/211831 A1 11/2018

OTHER PUBLICATIONS

International Search Report and Written Opinion of PCT Application No. PCT/JP2020/023243, issued on Aug. 18, 2020, 10 pages of ISRWO.

* cited by examiner

Figure 6:
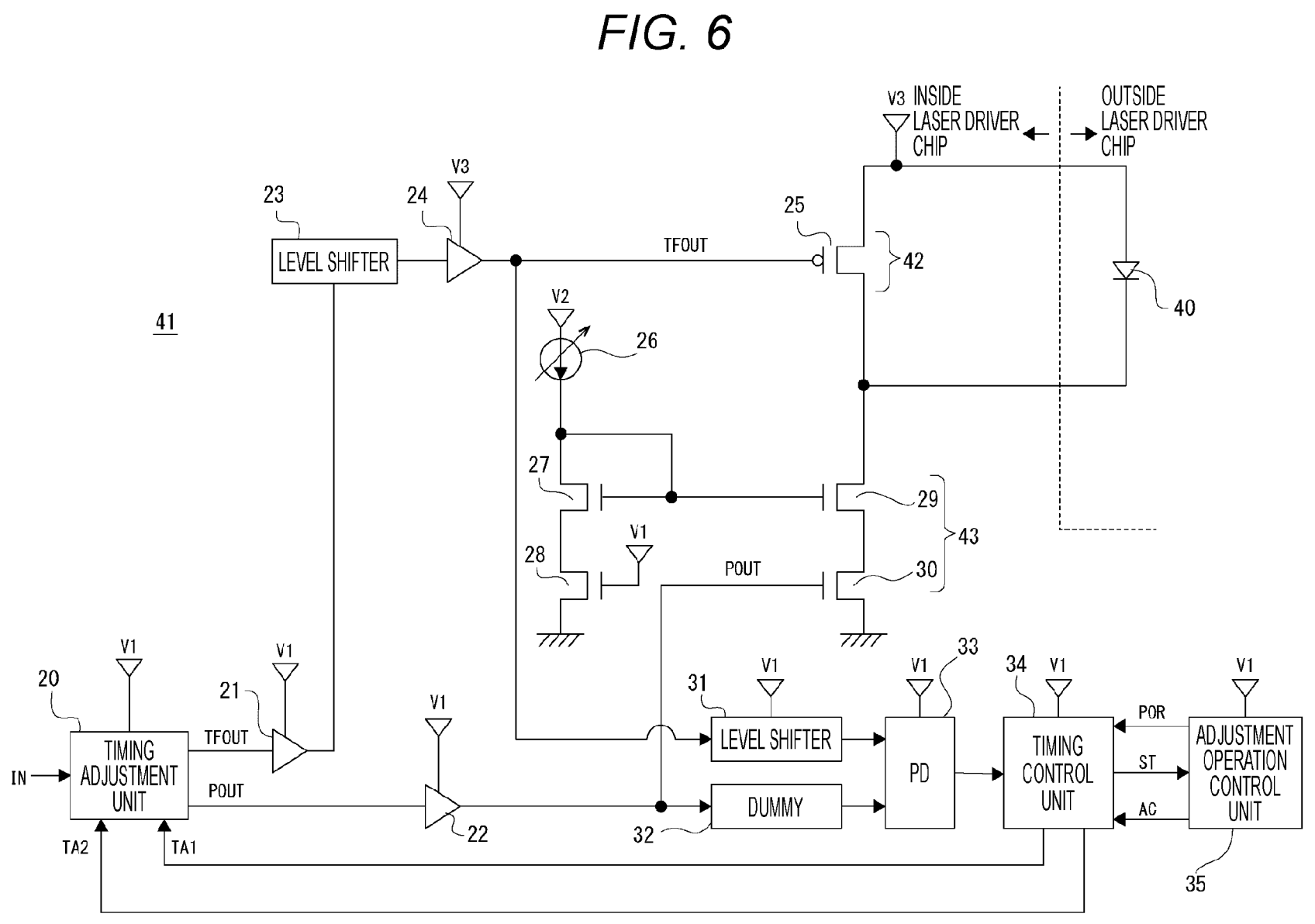

TIMING ADJUSTMENT UNIT
IN
TA1
TA2
TFOUT
POUT
LEVEL SHIFTER
LEVEL SHIFTER
DUMMY
PD
TIMING CONTROL UNIT
ADJUSTMENT OPERATION CONTROL UNIT
POR
ST
AC
V1
V2
V3
TFOUT
POUT
INSIDE LASER DRIVER CHIP
OUTSIDE LASER DRIVER CHIP
20 21 22 23 24 25 26 27 28 29 30 31 32 33 34 35 40 42 43

FIG. 7

V3 INSIDE LASER DRIVER CHIP
OUTSIDE LASER DRIVER CHIP
LEVEL SHIFTER
TFOUT
HA
41
TIMING ADJUSTMENT UNIT
IN
TFOUT
POUT
TA2
TA1
POUT
LEVEL SHIFTER
DUMMY
PD
TIMING CONTROL UNIT
ADJUSTMENT OPERATION CONTROL UNIT
POR
ST
AC
V1
V2
V3
20
21
22
23
24
25
26
27
28
29
30
31
32
33
34
35
36
37
40
42
43

FIG. 19

34
TIMING CONTROL UNIT
TA
oPD
33
PHASE DETECTION
36a
36b
POUT (K1)
POUT (K2)
POUT (Kn)
TFOUT (K1)
TFOUT (K2)
TFOUT (Kn)

Ta
M ROWS
B COLUMNS
L COLUMNS
A COLUMNS
Tc
Ch2
Ch3
Pd
CATHODE
ANODE

LASER DRIVE DEVICE, SENSING MODULE, AND TIMING ADJUSTMENT METHOD

CROSS REFERENCE TO RELATED APPLICATIONS

This application is a U.S. National Phase of International Patent Application No. PCT/JP2020/023243 filed on Jun. 12, 2020, which claims priority benefit of Japanese Patent Application No. JP 2019-139610 filed in the Japan Patent Office on Jul. 30, 2019. Each of the above-referenced applications is hereby incorporated herein by reference in its entirety.

TECHNICAL FIELD

The present technology relates to a laser drive device that drives a laser light emitting element, a sensing module including the laser drive device, and a timing adjustment method of the laser drive device.

BACKGROUND ART

As a light emitting element that emits laser light, a light emitting element as a vertical cavity surface emitting laser (VCSEL) is known.

The light emitting element as the VCSEL is configured such that an oscillator is formed in a direction perpendicular to a semiconductor substrate surface and laser light is emitted in the perpendicular direction. In recent years, the light emitting element as the VCSEL has been used widely as a light source when measuring a distance to a subject according to a structured light (STL) method or a time of flight (ToF) method, for example.

In a laser drive device that drives the light emitting element as the VCSEL, it is necessary to shorten a rise time and a fall time of a current flowing through the light emitting element in order to increase distance measurement accuracy.

Patent Document 1 below discloses a circuit capable of obtaining a high-speed falling waveform by short-circuiting both ends of a light emitting diode.

CITATION LIST

Patent Document

Patent Document 1: JP 2002-101047 A

SUMMARY OF THE INVENTION

Problems to be Solved by the Invention

For example, in the case of adopting a method of speeding up a fall time by short-circuiting both ends of a light emitting element as in Patent Document 1, a timing of the short-circuiting needs to match a timing of turning off of a current to the light emitting element by a drive transistor.

Here, as the laser drive device, it is necessary to take measures such that, for example, even if a transistor of an output stage is made to have a conventional film thickness, the preceding stage is made to be thinner by using a fine process, according to a request for mounting various functions.

Under such circumstances, a control signal is delayed up to the transistor for short-circuiting both ends of the light emitting element, the off timing and the short-circuiting timing of the drive transistor deviate from each other, and a deviation amount of the timing varies depending on various conditions. For this reason, pulse light emission with a short fall time cannot be performed.

Therefore, the present disclosure proposes a technology for accurately performing adjustment of the timing described above and implementing more appropriate pulse light emission.

Solutions to Problems

A laser drive device according to the present technology includes: a drive circuit that drives a light emitting element by a vertical cavity surface emitting laser to emit light on the basis of a drive control signal; an assist circuit that short-circuits both ends of the light emitting element on the basis of an assist control signal; a timing adjustment unit that performs mutual timing adjustment between the drive control signal and the assist control signal on the basis of a timing adjustment signal; a phase detection unit that detects a phase difference between the drive control signal and the assist control signal; and a timing control unit that generates the timing adjustment signal on the basis of a phase difference detection result of the phase detection unit.

The assist circuit short-circuits both ends of the light emitting element on the basis of the assist control signal, so that a fall time of a light emission driving current when light emission of the light emitting element is stopped can be shortened. That is, the fall time of the light emission driving current is sped up.

The timing of the assist operation needs to be matched with a timing of off of driving to emit light by the drive control signal. Thus, the timing adjustment of the drive control signal and the assist control signal is performed on the basis of the phase difference between the drive control signal and the assist control signal.

In the laser drive device according to the present technology described above, it is conceivable that the timing control unit generates the timing adjustment signal on the basis of the phase difference detection result of the phase detection unit continuously, periodically, or at a timing of detecting a predetermined adjustment trigger, and causes the timing adjustment unit to execute timing adjustment.

For example, adjustment is dynamically performed while laser emission drive is performed for distance measurement or the like.

In the laser drive device according to the present technology described above, it is conceivable that the drive control signal is supplied to a drive transistor of the drive circuit as a pulse signal of a first voltage, the assist control signal is supplied to an assist transistor of the assist circuit as a pulse signal having a voltage higher than the first voltage, and the phase detection unit performs phase comparison between the drive control signal extracted from a gate node of the drive transistor and the assist control signal extracted from a gate node of the assist transistor and level-shifted to the first voltage.

For example, phase comparison is performed between the drive control signal of the gate node of the drive transistor and the assist control signal of the gate node of the assist transistor. In this case, the assist control signal that is a high-voltage pulse signal is level-shifted and then subjected to the phase comparison.

In the laser drive device according to the present technology described above, it is conceivable that the drive control signal is supplied to a drive transistor of the drive circuit as a pulse signal of a first voltage, the assist control signal is supplied to an assist transistor of the assist circuit as a pulse signal having a voltage higher than the first voltage, and the phase detection unit performs phase comparison between the drive control signal and the assist control signal extracted from other than a gate node of the assist transistor and level-shifted to the first voltage.

For example, the assist control signal for phase comparison is extracted from other than the gate node, such as an input stage of a buffer amplifier, which applies a voltage to the gate node of the assist transistor.

In the laser drive device according to the present technology described above, it is conceivable that the drive control signal is supplied to a drive transistor of the drive circuit as a pulse signal of a first voltage, the assist control signal is supplied to an assist transistor of the assist circuit as a pulse signal having a voltage higher than the first voltage, and the phase detection unit performs phase comparison between the drive control signal extracted from other than a gate node of the drive transistor and the assist control signal.

For example, the drive control signal for phase comparison is extracted from other than the gate node, such as an input stage of the buffer amplifier, which applies a voltage to the gate node of the drive transistor 30.

In the laser drive device according to the present technology described above, it is conceivable that the timing adjustment unit includes: a first circuit that generates the drive control signal from an input signal and includes a delay circuit; and a second circuit that generates the assist control signal from the input signal, and performs timing adjustment by setting a delay time of the delay circuit according to the timing adjustment signal.

That is, the timing of the drive control signal is varied to adjust the mutual timings of the assist control signal and the drive control signal.

In the laser drive device according to the present technology described above, it is conceivable that the timing adjustment unit includes: a first circuit that generates the drive control signal from an input signal and includes a delay circuit; and a second circuit that generates the assist control signal from the input signal and includes a delay circuit, and performs timing adjustment by setting one or both of a delay time of the delay circuit of the first circuit and a delay time of the delay circuit of the second circuit according to the timing adjustment signal.

That is, a delay circuit with a variable delay time is provided in both systems of the drive control signal and the assist control signal so that each timing can be adjusted.

In the laser drive device according to the present technology described above, it is conceivable that the delay time of the delay circuit of the first circuit is adjusted in an adjustment period that is a non-operation period, and then the delay time of the delay circuit of the second circuit is variably adjusted in an actual operation period.

That is, a delay circuit with a variable delay time is provided in both systems of the drive control signal and the assist control signal, but timing adjustment is performed on the drive control signal side in the adjustment period. During the actual operation, adjustment is performed on the assist control signal side.

In the laser drive device according to the present technology described above, it is conceivable to further include a switch that cuts off current supply to the assist circuit and the light emitting element.

For example, a switch for cutting off a power supply voltage line for an anode of the light emitting element and the assist transistor of the assist circuit is provided.

In the laser drive device according to the present technology described above, it is conceivable that a plurality of the light emitting elements is driven.

As the laser drive device that drives the plurality of light emitting elements, timing adjustment of the drive control signal and the assist control signal is performed in a set of one or a plurality of drive circuits and assist circuits.

A sensing module according to the present technology includes: a light emission unit in which a plurality of light emitting elements by a vertical cavity surface emitting laser is arrayed; a laser drive device that drives the light emitting elements of the light emission unit; and a light reception sensor that receives and images light emitted from the light emission unit and reflected by a subject, in which the laser drive device includes: a drive circuit that drives a light emitting element by a vertical cavity surface emitting laser to emit light on the basis of a drive control signal; an assist circuit that short-circuits both ends of the light emitting element on the basis of an assist control signal to speed up a fall time of the light emitting element; a timing adjustment unit that performs mutual timing adjustment between the drive control signal and the assist control signal on the basis of a timing adjustment signal; a phase detection unit that detects a phase difference between the drive control signal and the assist control signal; and a timing control unit that generates the timing adjustment signal on the basis of a phase difference detection result of the phase detection unit.

In the sensing module according to the present technology described above, it is conceivable that a light emitting element chip on which the light emitting element is formed is arranged on a chip on which the laser drive device is formed.

The light emitting element chip is formed in a stacked state on the laser driver chip.

In the sensing module according to the present technology described above, it is conceivable that the assist circuit is arranged at a position immediately below the light emitting element chip in the chip on which the laser drive device is formed.

The assist circuit is arranged near an anode or a cathode of the light emitting element.

A timing adjustment method according to the present technology is a timing adjustment method of a laser drive device including a drive circuit that drives a light emitting element by a vertical cavity surface emitting laser to emit light on the basis of a drive control signal, and an assist circuit that short-circuits both ends of the light emitting element on the basis of an assist control signal, the timing adjustment method including: detecting a phase difference between the drive control signal and the assist control signal; generating a timing adjustment signal on the basis of a phase difference detection result; and performing mutual timing adjustment between the drive control signal and the assist control signal on the basis of the timing adjustment signal.

With this configuration, a timing of an assist operation and a timing of off of driving to emit light by the drive control signal are matched.

BRIEF DESCRIPTION OF DRAWINGS

FIG. 2 is a block diagram of a laser drive device of a first embodiment.

FIG. 6 is a block diagram of a laser drive device of a second embodiment.

FIG. 7 is a block diagram of a timing adjustment unit of the second embodiment.

FIG. 19 is an explanatory diagram of a configuration example of phase comparison in the case of driving of a plurality of lasers of the embodiment.

MODE FOR CARRYING OUT THE INVENTION

Hereinafter, embodiments will be described in the following order.

<1. Configuration of Distance Measurement Apparatus>
<2. First Embodiment>
<3. Second Embodiment>
<4. Third Embodiment>
>5. Fourth Embodiment>
<6. Configuration Examples of Phase Detection Unit>
<7. Laser Driving and Chip Structure>
<8. Conclusion and Modifications>

1. Configuration of Distance Measurement Apparatus

Figure 1:
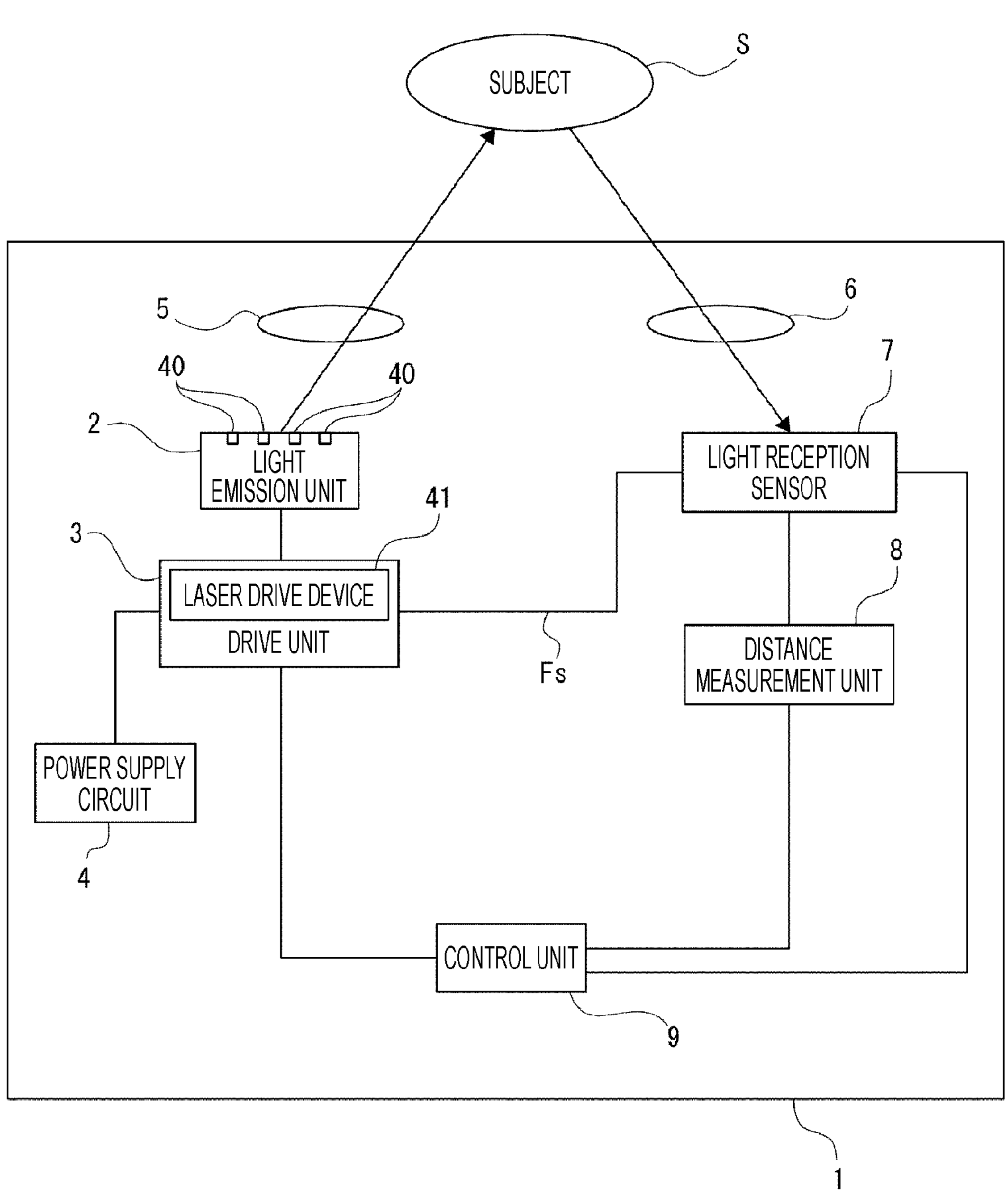
FIG. 1 is a block diagram of a configuration of a distance measurement apparatus according to an embodiment of the present technology.

FIG. 1 illustrates a configuration example of a distance measurement apparatus 1 including a laser drive device and a sensing module according to an embodiment of the present technology.

The distance measurement apparatus 1 includes a light emission unit 2, a drive unit 3, a power supply circuit 4, a light emission side optical system 5, a light reception side optical system 6, a light reception sensor 7, a distance measurement unit 8, and a control unit 9.

The light emission unit 2 emits light by one or a plurality of light sources. As will be described later, the light emission unit 2 of this example includes light emitting elements 40 by a vertical cavity surface emitting laser (VCSEL) as light sources, and the light emitting elements 40 are arrayed in a predetermined manner such as a matrix, for example.

The drive unit 3 includes electric circuits for driving the light emission unit 2. As one of the electric circuits, a laser drive device 41 that drives the light emitting elements 40 to emit light is provided.

Although details of the laser drive device 41 will be described later, the laser drive device 41 is an embodiment of the laser drive device of the present disclosure.

The power supply circuit 4 generates a power supply voltage of the drive unit 3 on the basis of, for example, an input voltage from a battery and the like (not illustrated) provided in the distance measurement apparatus 1. The drive unit 3 drives the light emission unit 2 on the basis of the power supply voltage.

Light emitted from the light emission unit 2 is emitted to a subject S as a distance measurement target via the light emission side optical system 5. Then, reflected light of light emitted in this manner from the subject S is incident on a light reception surface of the light reception sensor 7 via the light reception side optical system 6.

The light reception sensor 7 is, for example, an image sensor such as a charge coupled device (CCD) sensor or a complementary metal oxide semiconductor (CMOS) sensor, and receives reflected light from the subject S incident via the light reception side optical system 6 as described above, converts the reflected light into an electric signal, and outputs the electric signal.

The light reception sensor 7 executes, for example, correlated double sampling (CDS) processing, automatic gain control (AGC) processing, and the like on the electric signal obtained by photoelectrically converting the received light, and further performs analog/digital (A/D) conversion processing. Then, the light reception sensor 7 outputs a light reception signal as digital data to the distance measurement unit 8 in the subsequent stage.

Furthermore, the light reception sensor 7 of this example outputs a frame synchronization signal Fs to the drive unit 3. This allows the drive unit 3 to cause the light emitting elements 40 in the light emission unit 2 to emit light at a timing according to a frame cycle of the light reception sensor 7.

The distance measurement unit 8 measures a distance to the subject S on the basis of an input light reception signal, that is, a signal obtained by receiving reflected light from the subject S.

The control unit 9 includes, for example, a microcomputer having a central processing unit (CPU), a read only memory (ROM), a random access memory (RAM), and the like or an information processing device such as a digital signal processor (DSP). The control unit 9 controls the drive unit 3 for controlling a light emission operation by the light emission unit 2, and exercises control related to an imaging operation by the light reception sensor 7.

In the distance measurement apparatus 1 having the above configuration, the sensing module as an embodiment of the present disclosure includes at least the light emission unit 2, the light reception sensor 7, and the laser drive device 41.

As a distance measurement method in the distance measurement apparatus 1, for example, a distance measurement method using a structured light (STL) method or a time of flight (ToF) method can be adopted.

The STL method is, for example, a method of measuring a distance on the basis of an image obtained by imaging of the subject S on which light having a predetermined light/dark pattern such as a dot pattern or a grid pattern is emitted.

The ToF method is a method of measuring a distance to an object by detecting a time of flight (time difference) of light emitted from the light emission unit 2 until the light is reflected by the object and reaches the light reception sensor 7.

In a case where a so-called direct ToF method is adopted as the ToF method, a single photon avalanche diode (SPAD) is used as the light reception sensor 7, and the light emission unit 2 is pulse-driven. In this case, on the basis of an input light reception signal, the distance measurement unit 8 calculates a time difference from light emission to light reception of light emitted from the light emission unit 2 and received by the light reception sensor 7, and calculates a distance of each part of the subject S on the basis of the time difference and a speed of light.

Note that, in a case where a so-called indirect ToF method (phase difference method) is adopted as the ToF method, for example, an IR light reception sensor is used as the light reception sensor 7.

In the present disclosure, features of the laser drive device 41 and the light emission unit 2 will be mainly described, but the technology is particularly suitable in a case where the direct ToF method is adopted.

2. First Embodiment

Figure 2:
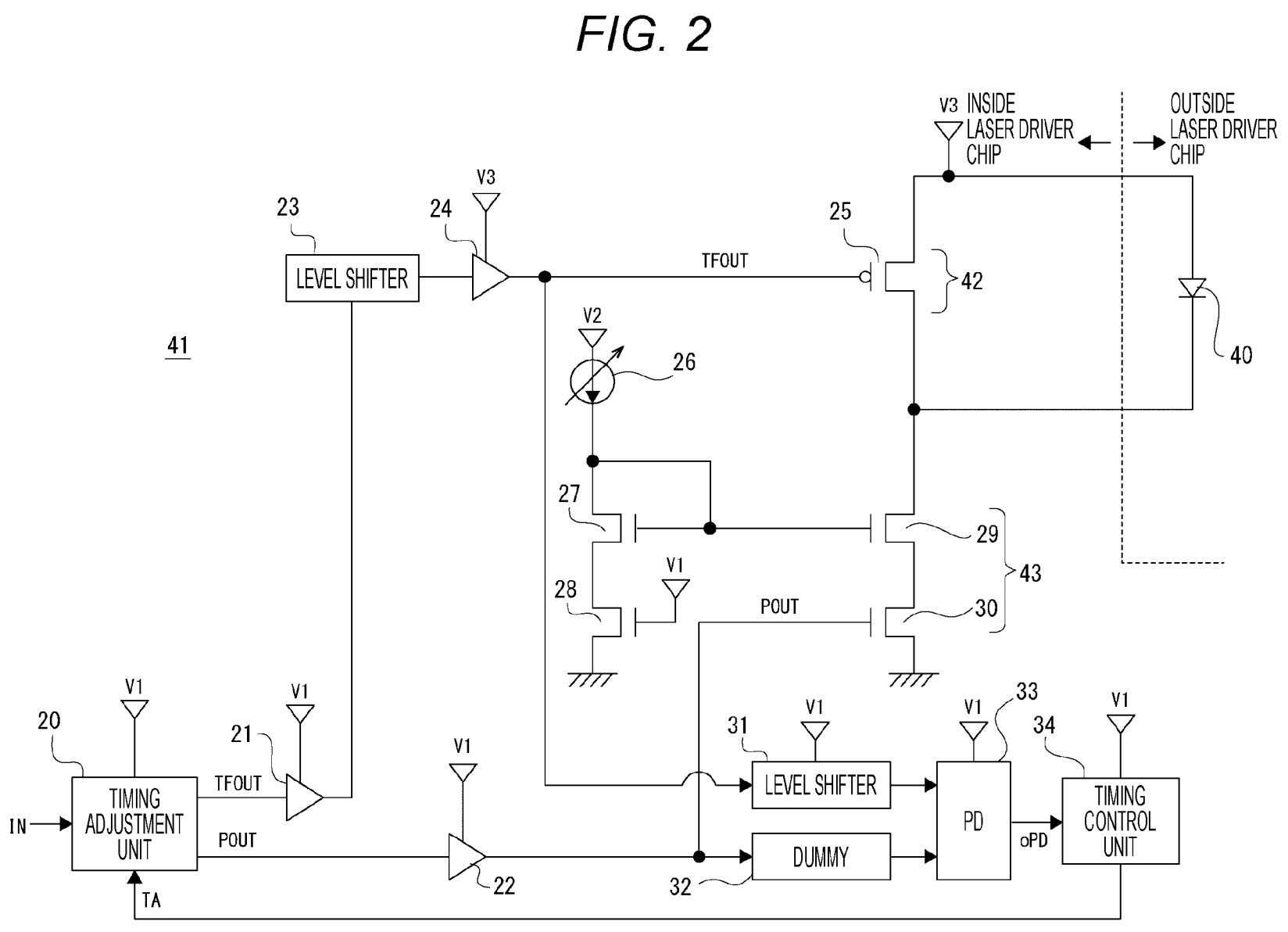

FIG. 2 illustrates a configuration of a laser drive device 41 as a first embodiment. Note that, in FIG. 2, one light emitting element 40 in a light emission unit 2 is also illustrated for description of a circuit configuration.

Note that components other than the light emitting element 40 are configured in a laser driver chip constituting a drive unit 3. The light emitting element 40 is provided on another chip, for example, a VCSEL chip to be described later as an example of the light emission unit 2.

A pulse signal (see FIG. 5) indicating a laser emission period is input to the laser drive device 41 as an input signal IN from a circuit in the preceding stage. The input signal IN is a signal generated at a timing based on the frame synchronization signal Fs under the control of a control unit 9.

The input signal IN is input to a timing adjustment unit 20.

The timing adjustment unit 20 generates a drive control signal POUT and an assist control signal TFOUT from the input signal IN.

Note that the drive control signal POUT is a signal for causing a drive circuit 43 to execute laser emission drive, and is a signal supplied to a gate of a drive transistor 30. For description, a signal output from the timing adjustment unit 20 to a gate node of the drive transistor 30 by an N-channel field effect transistor (FET) (and a signal to a phase detection unit 33 to be described later) is referred to as the drive control signal POUT.

Furthermore, the assist control signal TFOUT is a signal for causing an assist circuit 42 to execute fall assist of a laser drive current, and is a signal supplied to a gate of an assist transistor 25. For description, a signal output from the timing adjustment unit 20 to a gate node of the assist transistor 25 by a P-channel FET (and a signal to the phase detection unit 33 to be described later) is referred to as the assist control signal TFOUT.

The drive control signal POUT output from the timing adjustment unit 20 is supplied to the gate of the drive transistor 30 via a buffer amplifier 22.

The assist control signal TFOUT output from the timing adjustment unit 20 is supplied to a level shifter 23 via a buffer amplifier 21, subjected to voltage conversion, and then supplied to the gate of the assist transistor 25 via a buffer amplifier 24.

A drain and a source of the assist transistor 25 are connected to an anode and a cathode of the light emitting element 40. In addition, the anode of the light emitting element 40 is connected to a power supply line of a voltage V3.

Between the cathode of the light emitting element 40 and a ground, a transistor 29 and the drive transistor 30 by the N-channel FET are connected in series.

Furthermore, gates of the transistor 29 and a transistor 27 (N-channel FET) are connected, and the gate and a drain of the transistors are connected.

Furthermore, a transistor 28 (N-channel FET) is connected between a source of a transistor 27 and a ground, and a current source 26 connected to a power supply line of a voltage V2 flows a drain-source current with respect to a series connection of the transistors 27 and 28. A voltage V1 is supplied to a gate of the transistor 28.

Thus, a current mirror circuit is configured, and a current equivalent to the current flowing through the transistors 27 and 28 flows through the transistor 29 and the drive transistor 30. That is, a value of a light emission driving current of the light emitting element 40 is defined by the current mirror circuit, and the light emission driving current is turned on/off by the drive transistor 30.

With this configuration, the light emission driving current flows through the light emitting element 40 at a timing when a pulse as the drive control signal POUT supplied to the gate of the drive transistor 30 becomes a high level (hereinafter, "H level"), and laser light emission is performed.

Note that the drive circuit 43 is a circuit that drives the light emitting element 40 to emit light on the basis of the drive control signal POUT, and refers to the drive transistor 30 and the transistor 29. However, the transistors 27 and 28 and the current source 26 may also be included and referred to as the drive circuit 43.

Since the assist transistor 25 is connected in parallel with the light emitting element 40 as described above, when the assist transistor 25 is turned on, the anode and the cathode of the light emitting element 40 are short-circuited, the light emission driving current does not flow, and light emission is stopped. Thus, by turning on the assist transistor 25 in accordance with a timing of turning off the drive transistor 30, a fall time can be shortened.

The assist circuit 42 refers to at least the assist transistor 25, but may also be considered to include the buffer amplifier 24 and the level shifter 23.

Here, the voltages V1, V2, and V3 are illustrated in FIG. 2, and here, for example, V1<V2≤V3 is satisfied.

In addition, the timing adjustment unit 20, the buffer amplifiers 21 and 22, and the transistor 28 use the voltage V1 as the power supply voltage.

On the other hand, a power supply for the buffer amplifier 24 and the assist transistor 25 is the voltage V3.

In the case of the configuration described above, a function of shortening a fall time by the assist transistor 25 may not function sufficiently.

In the laser drive device 41 that drives the light emitting element 40 as the VCSEL, it is necessary to shorten a rise time and a fall time of a current flowing through the light emitting element 40 in order to increase distance measurement accuracy. Thus, as illustrated in FIG. 2, the fall time is sped up by the assist circuit 42.

Meanwhile, as the laser drive device 41, it is necessary to take measures such that, for example, even if a transistor of an output stage is made to have a conventional film thickness, the front end is made to be thinner by using a fine process, according to a request for mounting various functions.

As a result, in the example of FIG. 2, a configuration is adopted where, even if a transistor in the buffer amplifier 24 is made to have a conventional film thickness, the buffer amplifiers 21 and 22 use a thinner transistor. In addition, a path of the drive control signal POUT uses the voltage V1 as the power supply, and a path of the assist control signal TFOUT uses the voltage V3 as the power supply.

For this reason, the assist control signal TFOUT on the assist circuit 42 side causes, until the final assist transistor 25 is driven, more delay than delay until the drive control signal POUT drives the drive transistor 30.

Then, in consideration of the delay, it is necessary to delay and adjust a timing of the drive control signal for the drive transistor 30 on the drive circuit 43 side. Moreover, an optimum delay time varies depending on temperature, a power supply voltage state, and the like.

Since a light emission stop timing at which the drive transistor 30 is turned off matches an assist start timing at which the assist transistor 25 is turned on, a sufficient effect of shortening the fall time of the light emission driving current can be obtained.

More specifically, it is necessary that the light emission stop timing by the drive control signal POUT at the gate node of the drive transistor 30 and the assist start timing by the assist control signal TFOUT at the gate node of the assist transistor 25 match.

However, considering that the delay time of the assist control signal TFOUT with respect to the drive control signal POUT at each gate node varies depending on temperature, a power supply voltage state, and the like, it is difficult to adjust the timings to match.

Therefore, the laser drive device 41 of FIG. 2 adopts a configuration including the phase detection unit 33, a timing control unit 34, a level shifter 31, and a dummy circuit 32.

The assist control signal TFOUT at the gate node of the assist transistor 25 is input to the level shifter 31.

Furthermore, the drive control signal POUT at the gate node of the drive transistor 30 is input to the dummy circuit 32.

The level shifter 31 performs voltage level shifting of the assist control signal TFOUT to a voltage V1 system pulse signal. The dummy circuit 32 gives delay equivalent to a delay time by the level shifter 31 to the drive control signal POUT.

The phase detection unit 33 performs phase comparison between the assist control signal TFOUT output from the level shifter 31 and the drive control signal POUT output from the dummy circuit 32.

Figure 3:
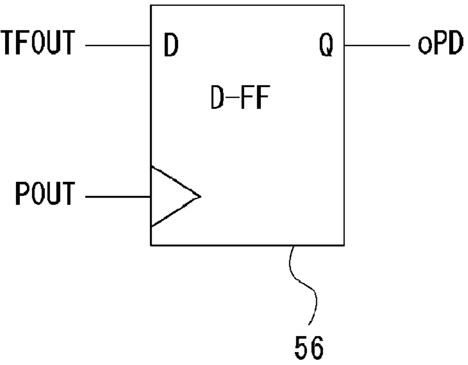
FIG. 3 is an explanatory diagram of a phase detection unit of the first embodiment.

The phase detection unit 33 can include, for example, a D-flip-flop 56 as illustrated in FIG. 3. For example, the assist control signal TFOUT is used as a clock input, the drive control signal POUT is used as a D input, and a phase comparison signal oPD is obtained as a Q output. Alternatively, the assist control signal TFOUT may be used as the D input, and the drive control signal POUT may be used as the clock input.

Note that, in a case where the D-flip-flop 56 makes determination on the basis of a rise of the clock input, by using a side in the assist control signal TFOUT and the drive control signal POUT that rises at a timing when a phase comparison should be performed as the clock input, it is not necessary to provide an extra buffer for pulse inversion, which is advantageous in terms of phase comparison characteristics.

The phase comparison signal oPD is input to the timing control unit 34. The timing control unit 34 includes a logic circuit or an arithmetic processing unit (CPU). A timing adjustment signal TA is generated on the basis of the phase comparison signal oPD, and supplied to the timing adjustment unit 20.

Note that the phase detection unit 33 and the timing control unit 34 operate using the voltage V1 as the power supply voltage.

Figure 4:
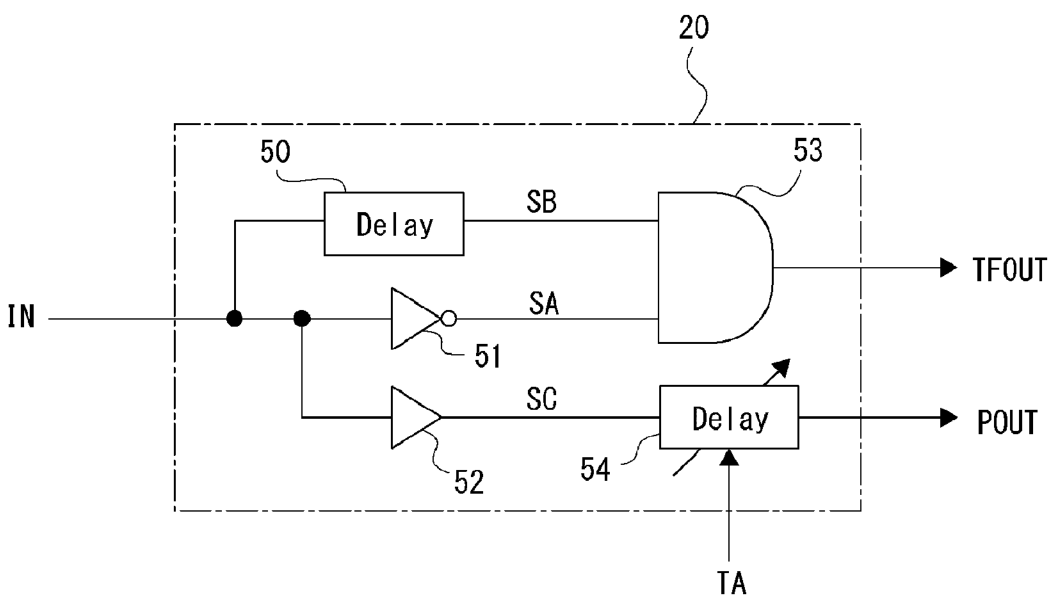
FIG. 4 is a block diagram of a timing adjustment unit of the first embodiment.

A configuration example of the timing adjustment unit 20 is illustrated in FIG. 4. Furthermore, FIG. 5 illustrates operation waveforms of the respective units.

The input signal IN described above is input to a delay circuit 50, an inverter 51, and a buffer amplifier 52 in the timing adjustment unit 20 of FIG. 4.

Figure 5:
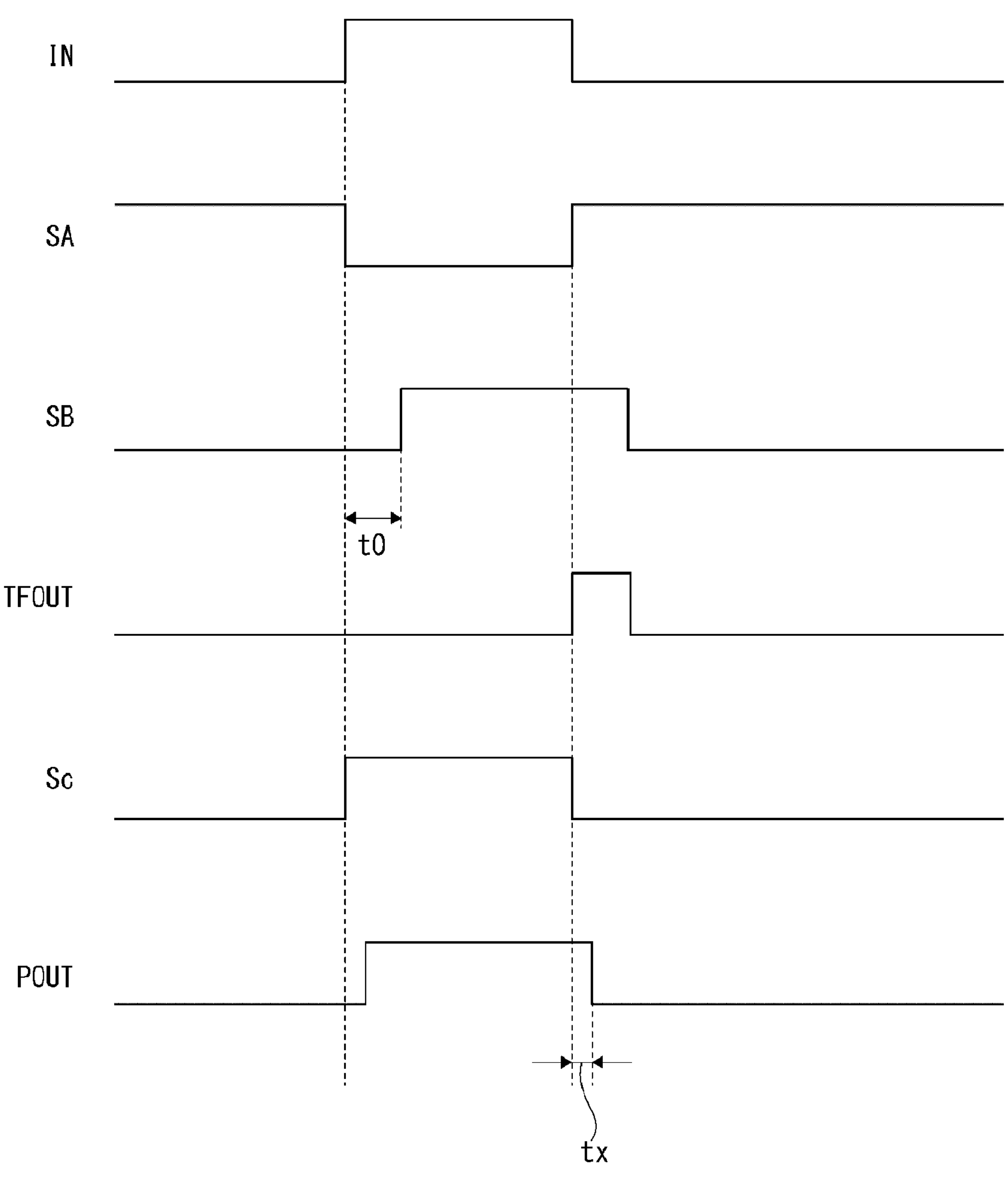
FIG. 5 is an explanatory diagram of operation waveforms of the timing adjustment unit of the first embodiment.

A signal SA obtained by inverting the input signal IN by the inverter 51 and a signal SB obtained by delaying the input signal IN by the delay circuit 50 by a predetermined time t0 are input to an AND gate 53, and the assist control signal TFOUT is obtained as an AND output of the AND gate 53 (see FIG. 5).

On the other hand, a signal SC (≈ input signal IN) from the buffer amplifier 52 is delayed by a delay circuit 54 by a time tx to become the drive control signal POUT (see FIG. 5).

Here, a delay time of the delay circuit 54 is variable, and the time tx, which is the delay time, is variably adjusted by the timing adjustment signal TA.

In the phase comparison signal oPD by the phase detection unit 33, delay of a rising timing of the assist control signal TFOUT at the gate node of the assist transistor 25 with respect to a falling timing of the drive control signal POUT at the gate node of the drive transistor 30 appears. In response to this, the delay time of the delay circuit 54 is adjusted by the timing adjustment signal TA.

With this configuration, the delay time of the drive control signal POUT is dynamically adjusted regardless of variations in various conditions (temperature and voltage state) at that time, and the timing of the drive control signal POUT and the timing of the assist control signal TFOUT are matched.

Therefore, the assist circuit 42 functions appropriately, and the effect of shortening the fall time of the light emission driving current can be obtained.

Note that the adjustment of the delay time given to the drive control signal POUT based on such phase comparison is desirably performed continuously or periodically during a period in which a laser light emission operation. By dynamically adjusting the delay time in this manner, even if an optimum delay time changes according to variations in a temperature condition and a power supply voltage state, the delay time can be optimized accordingly.

Furthermore, such delay time adjustment for the drive control signal POUT may be performed according to detection of a variation in condition. For example, it is conceivable to perform the delay time adjustment with detection of a temperature change equal to or more than a predetermined amount as a trigger after the delay time adjustment is performed once.

Furthermore, even if such delay time adjustment is performed only in a calibration period before an actual operation is performed as the sensing module, for example, a certain effect can be obtained. For example, the delay time adjustment may be performed only before factory shipment, during a preparation period before an actual operation on a user side, or the like.

For example, in a case where the configuration as the timing control unit 34 is not provided in the laser driver chip, it is also conceivable to connect a timing control unit 34 outside the laser driver chip at a stage before factory shipment so that the delay time adjustment is performed.

3. Second Embodiment

Figure 7:
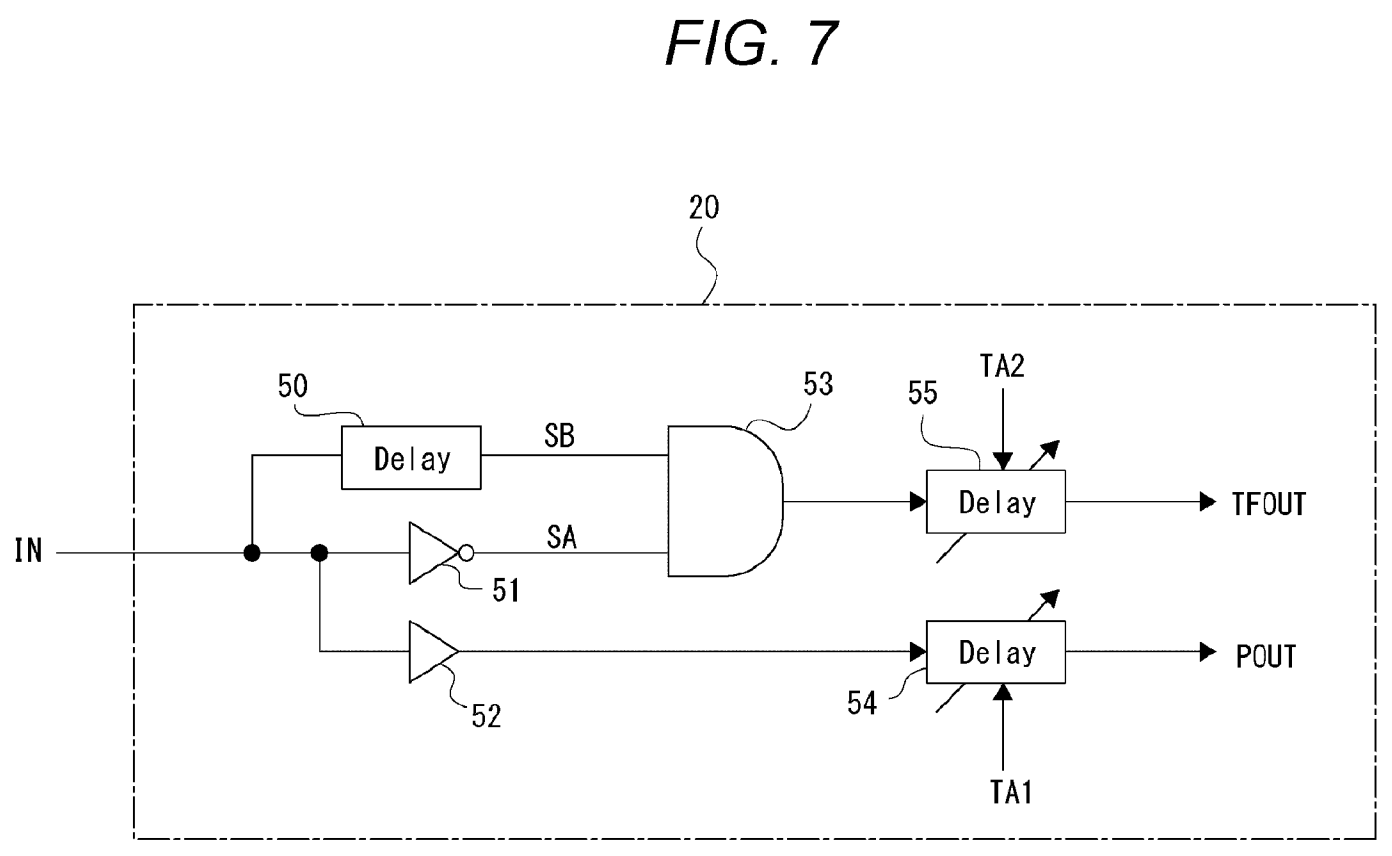

A second embodiment will be described with reference to FIGS. 6 and 7. FIG. 6 illustrates a configuration of a laser drive device 41, and FIG. 7 illustrates a configuration of a timing adjustment unit 20. Note that, in FIGS. 6 and 7, the same parts as those in FIGS. 2 and 4 are denoted by the same reference signs, and description thereof is omitted.

FIG. 6 differs from FIG. 2 in that an adjustment operation control unit 35 is provided in the laser drive device 41 to control a delay time adjustment operation.

The adjustment operation control unit 35 includes a logic circuit or an arithmetic processing unit (CPU), and controls an operation of a timing control unit 34. Note that the adjustment operation control unit 35 also uses a voltage V1 as a power supply voltage.

Furthermore, the timing control unit 34 generates timing adjustment signals TA1 and TA2 in accordance with an instruction from the adjustment operation control unit 35.

As illustrated in FIG. 7, the configuration of the timing adjustment unit 20 is provided with a delay circuit 55 that gives a delay time to an output of an AND gate 53.

In addition, in the timing adjustment unit 20, in addition to a delay circuit 54 variably setting a delay time according to the timing adjustment signal TA1, the delay circuit 55 can variably set a delay time according to the timing adjustment signal TA2.

That is, a delay time of a drive control signal POUT can be adjusted by the timing adjustment signal TA1, and a delay time of an assist control signal TFOUT can be adjusted by the timing adjustment signal TA2.

A specific example of the control by the adjustment operation control unit 35 will be described.

For example, the adjustment operation control unit 35 outputs a power-on reset signal POR in a calibration period before a circuit operation of the laser drive device 41.

In response to the power-on reset signal POR, the timing control unit 34 generates the timing adjustment signal TA1 in response to a phase comparison signal oPD from a phase detection unit 33, and adjusts the delay time of the delay circuit 54.

Note that, at this time, it is conceivable to adjust a light emission stop timing (timing when a drive transistor 30 is turned off by the drive control signal POUT) to be delayed from an assist start timing (timing when an assist transistor 25 is turned on by the assist control signal TFOUT).

When such preliminary adjustment by the timing adjustment signal TA1 is completed, the timing control unit 34 transmits a completion notification signal ST to the adjustment operation control unit 35 to notify that the preliminary adjustment is completed.

When the laser drive device 41 starts an actual operation, the adjustment operation control unit 35 transmits an active signal AC to the timing control unit 34. In response to the active signal AC, the timing control unit 34 generates the timing adjustment signal TA2 in response to the phase comparison signal oPD from the phase detection unit 33, and adjusts the delay time of the delay circuit 55.

In this case, the delay time of the delay circuit 55 is adjusted so that the light emission stop timing and the assist start timing match.

According to the second embodiment having such a configuration, it is possible to prevent the delay time of the drive control signal POUT (the delay time by the delay circuit 54) from changing during an actual operation period.

When the delay time of the drive control signal POUT is changed in an actual laser emission period, a light emission timing of a light emitting element 40 changes.

Since the light emission timing of the light emitting element 40 relates to distance measuring calculation, it is desirable that the light emission timing does not change as much as possible. When the light emission timing changes during an operation, it is necessary to reflect the change in calculation of a time difference from light emission to light reception of a distance measurement unit 8 each time. This is because when the time difference varies, a measured distance changes and distance measurement performance deteriorates.

Thus, an overall processing load of a distance measurement apparatus 1 increases.

However, in order to match the assist start timing and the light emission stop timing, the assist control signal TFOUT has a larger delay amount for a reason associated with the circuit, and thus it is necessary to delay the drive control signal POUT as described in the first embodiment.

Therefore, in the second embodiment, the delay time of the drive control signal POUT is adjusted in the calibration period so that at least a delay time longer than the delay time of the assist control signal TFOUT is given.

Then, during the actual operation period, the delay time of the assist control signal TFOUT is adjusted so that the light emission stop timing and the assist start timing match.

With this configuration, the light emission timing of the light emitting element 40 can be prevented from varying during the operation period, and the entire processing of the distance measurement apparatus 1 is facilitated.

4. Third Embodiment

A third embodiment of a laser drive device 41 will be described with reference to FIG. 8. Note that the same parts as those in the embodiments described above are denoted by the same reference signs, and description thereof is omitted.

Although a circuit configuration is substantially similar to that of FIG. 6, this is an example in which a drive control signal POUT for phase comparison is extracted from other than a gate node of a drive transistor 30 and an assist control signal TFOUT for phase comparison is extracted from other than a gate node of an assist transistor 25.

Figure 8:
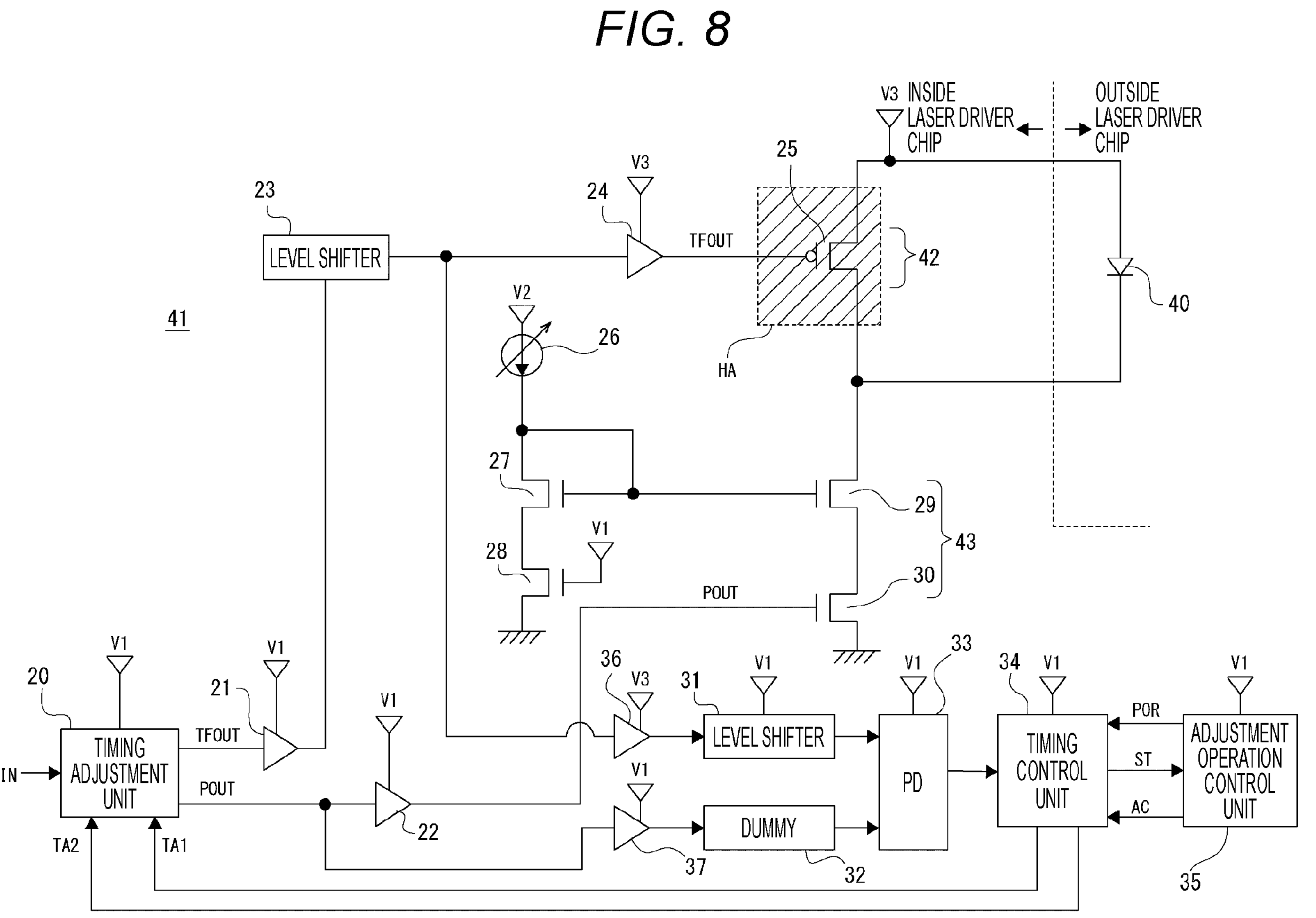
FIG. 8 is a block diagram of a laser drive device of a third embodiment.

In the example of FIG. 8, the assist control signal TFOUT is extracted from an input stage of a buffer amplifier 24 and input to a level shifter 31 via a buffer amplifier 36.

Furthermore, the drive control signal POUT is extracted from an input stage of a buffer amplifier 22 and input to a dummy circuit 32 via a buffer amplifier 37.

In order to match a light emission stop timing and an assist start timing, it is best to extract the drive control signal POUT and the assist control signal TFOUT from the gate nodes of the drive transistor 30 and the assist transistor 25 and performs phase comparison as in the first and second embodiments. This is because adjustment can be performed on the basis of final gate drive timings of the drive transistor 30 and the assist transistor 25.

However, in a case where a large number of light emitting elements 40 are actually driven, when the drive control signal POUT and the assist control signal TFOUT are all extracted from the gate nodes, wiring may be complicated.

Thus, by extracting the drive control signal POUT and the assist control signal TFOUT from other than the gate nodes, wiring in a laser driver chip can be simplified.

Although a configuration for driving a plurality of the light emitting elements 40 will be described later, by extracting the drive control signal POUT and assist control signal TFOUT for phase comparison from other than the gate nodes, it is possible to collectively perform phase comparison for drive systems of the plurality of light emitting elements 40, and the wiring may be simplified.

Note that, in the case of FIG. 8, the assist control signal TFOUT extracted from the input stage of the buffer amplifier 24 does not reflect delay in the buffer amplifier 24. Similarly, the drive control signal POUT extracted from the input stage of the buffer amplifier 22 does not reflect delay in the buffer amplifier 24.

Since film thicknesses of the buffer amplifier 24 and the buffer amplifier 22 are different and delay times are not the same, even if phases are compared as they are, accuracy of adjustment of the light emission stop timing and the assist start timing is low.

Thus, the assist control signal TFOUT is input to the level shifter 31 via the buffer amplifier 36, which is a transistor having the same film thickness as the buffer amplifier 24 and uses a power supply voltage V3.

Furthermore, the drive control signal POUT is input to the dummy circuit 32 via the buffer amplifier 37, which is a transistor having the same film thickness as the buffer amplifier 22 and uses a power supply voltage V1. With this configuration, phase comparison accuracy can be maintained even if the drive control signal POUT and the assist control signal TFOUT are extracted from other than the gate nodes.

Note that there are various configurations in which the drive control signal POUT and the assist control signal TFOUT are extracted from other than the gate nodes. For example, in a case where a multistage buffer amplifier is provided on paths of the drive control signal POUT and the assist control signal TFOUT, various portions to extract can be considered.

Furthermore, it is also conceivable to extract one of the drive control signal POUT and the assist control signal TFOUT from other than the gate node. Also in this case, delay time adjustment based on accurate phase comparison becomes possible by adopting a configuration in which a delay time at the gate node is reflected in a phase comparison stage.

For example, a configuration can be considered in which the drive control signal POUT is extracted from the gate node of the drive transistor 30 and input to the dummy circuit 32, and the assist control signal TFOUT is extracted from the input stage of the buffer amplifier 24 and input to the level shifter 31 via the buffer amplifier 36.

Furthermore, a configuration can be considered in which the drive control signal POUT is extracted from the input stage of the buffer amplifier 22 and input to the dummy circuit 32 via the buffer amplifier 37, and the assist control signal TFOUT is extracted from the gate node of the assist transistor 25 and input to the level shifter 31.

5. Fourth Embodiment

Figure 9:
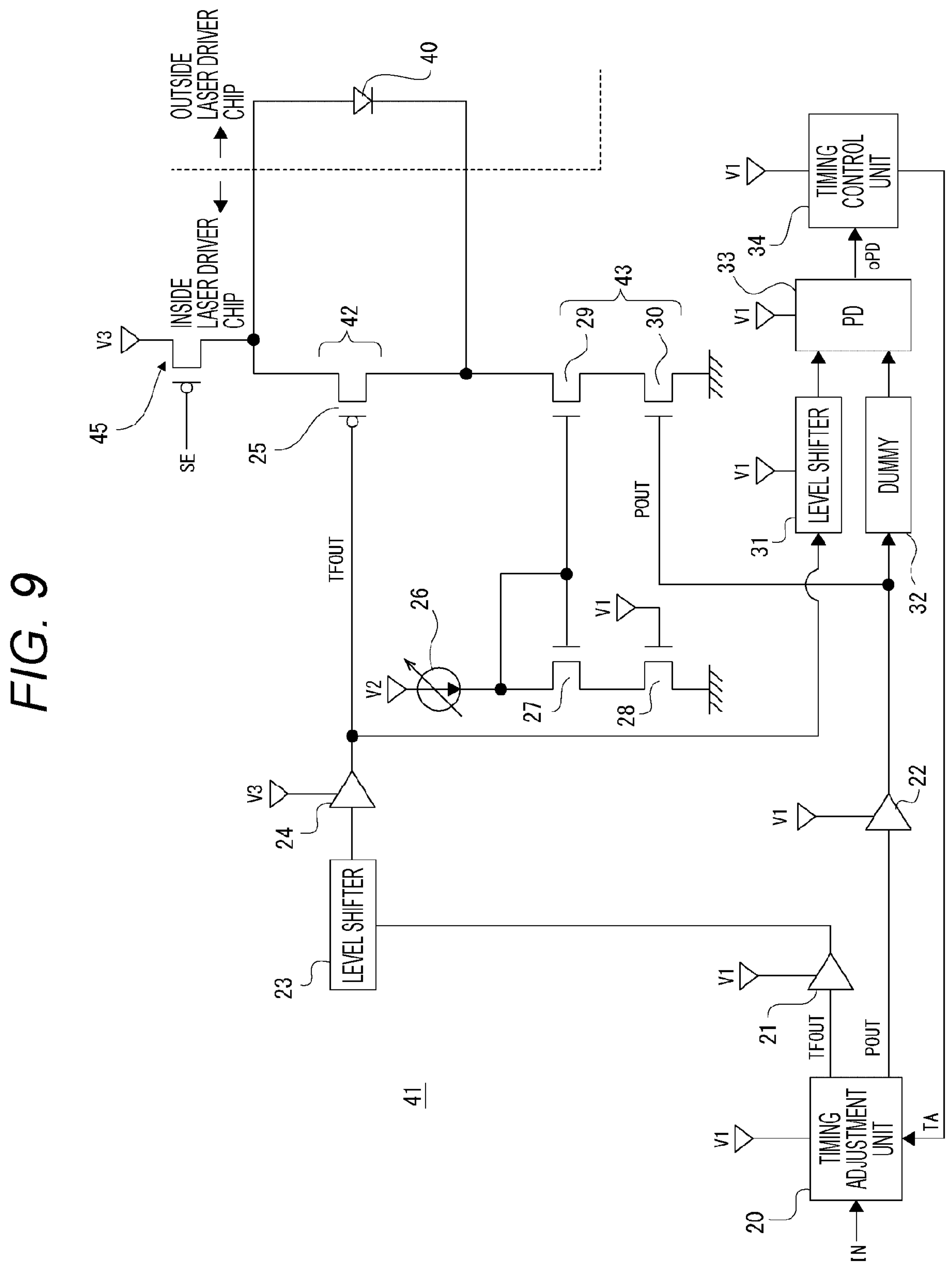
FIG. 9 is a block diagram of a laser drive device of a fourth embodiment.

FIG. 9 illustrates a laser drive device 41 of a fourth embodiment.

This is obtained by adding a switch 45 to the circuit configuration of FIG. 2. The switch 45 includes, for example, a P-channel FET. The switch 45 is turned off by an error signal SE, and cuts off a light emission driving current based on a voltage V3 with respect to a light emitting element 40.

For example, when some abnormality is detected, such as in a case where an excessive current flows through the light emitting element 40, or in a case where a pulse waveform of a drive control signal POUT is abnormal, for example, in a case where a pulse width is too long, the switch 45 is turned off by the error signal SE, so that it is possible to stop continuation of laser emission drive in the abnormal state.

6. Configuration Examples of Phase Detection Unit

Other configuration examples of the phase detection unit 33 that can be adopted in the first, second, third, and fourth embodiments described above will be described.

Figure 10:
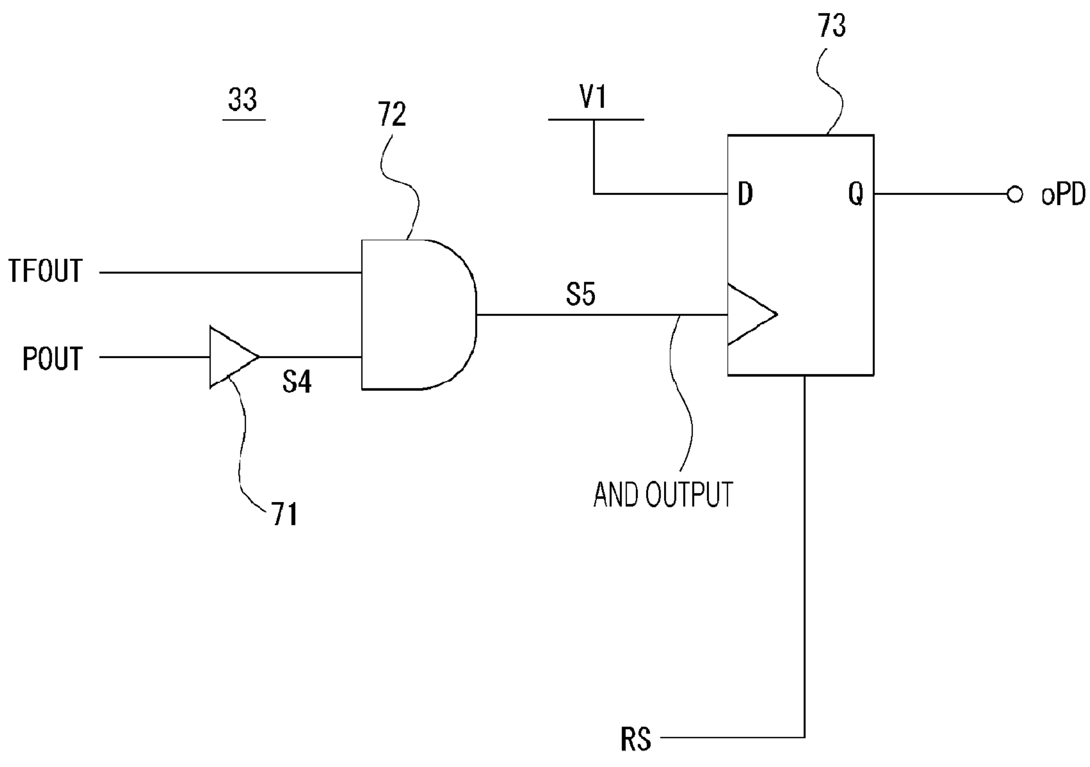
FIG. 10 is an explanatory diagram of a configuration example of a phase detection unit of an embodiment.
Figure 11:
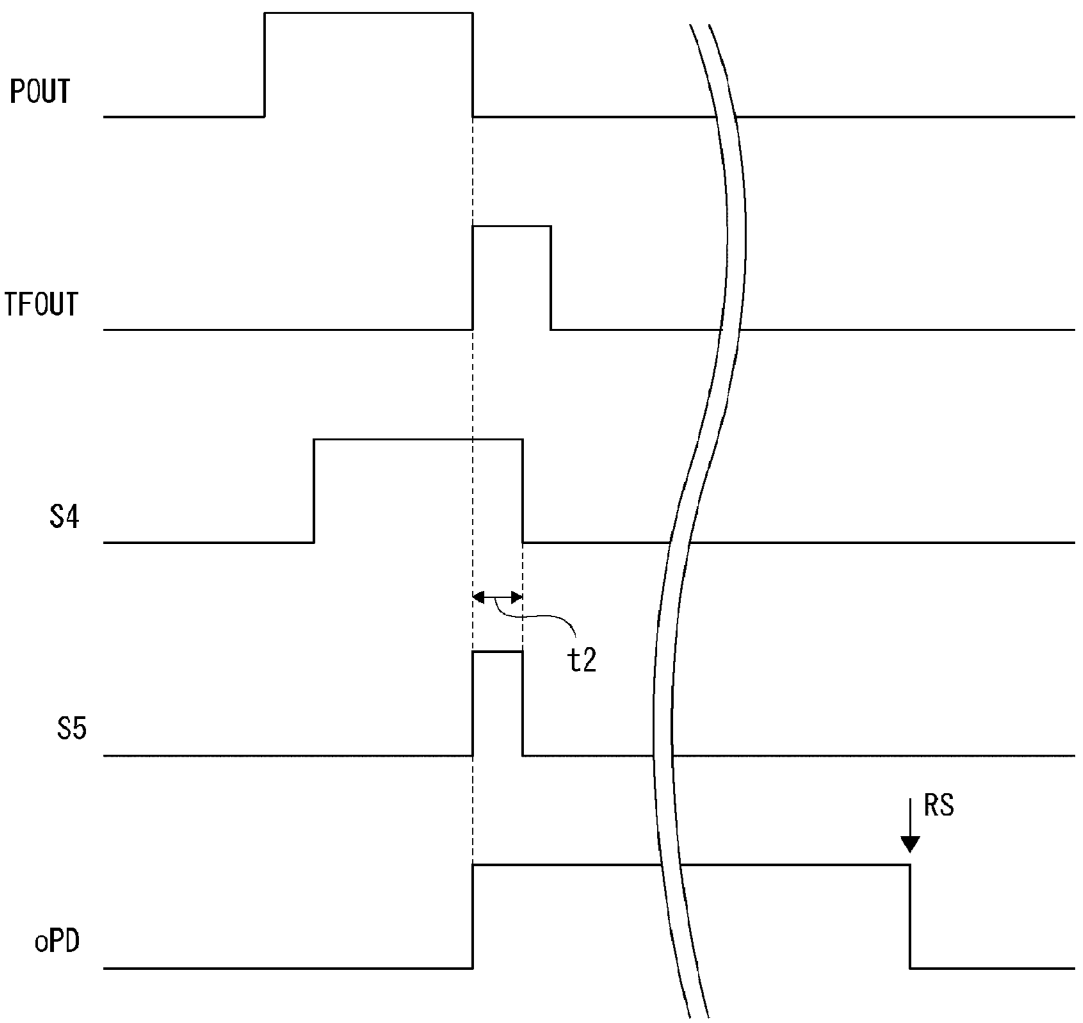
FIG. 11 is an explanatory diagram of operation waveforms of the phase detection unit of the embodiment.

FIG. 10 illustrates an example in which the phase detection unit 33 includes an amplifier 71, an AND gate 72, and a flip-flop 73. FIG. 11 illustrates signal waveforms of the respective units.

An assist control signal TFOUT is used as one input of the AND gate.

A drive control signal POUT is delayed by a predetermined time t2 by the buffer amplifier 71 to become a signal S4, and this signal S4 is used as another input of the AND gate 72.

When timings of the assist control signal TFOUT and the drive control signal POUT match, a short pulse of the time t2 as illustrated in FIG. 11 is obtained as a signal S5 output from the AND gate 72.

If delay of the assist control signal TFOUT is large (time t2 or more), the short pulse as the signal S5 cannot be obtained.

The signal S5 is used as a trigger and used as a clock input of the flip-flop 73. A fixed voltage (for example, voltage V1) is applied to a D input of the flip-flop 73.

Then, when the timings of the assist control signal TFOUT and the drive control signal POUT match, an output oPD as illustrated in the drawing is obtained.

Note that the output oPD is reset by a reset signal RS.

The delay time adjustment can be performed also by such a phase detection unit 33.

Figure 12:
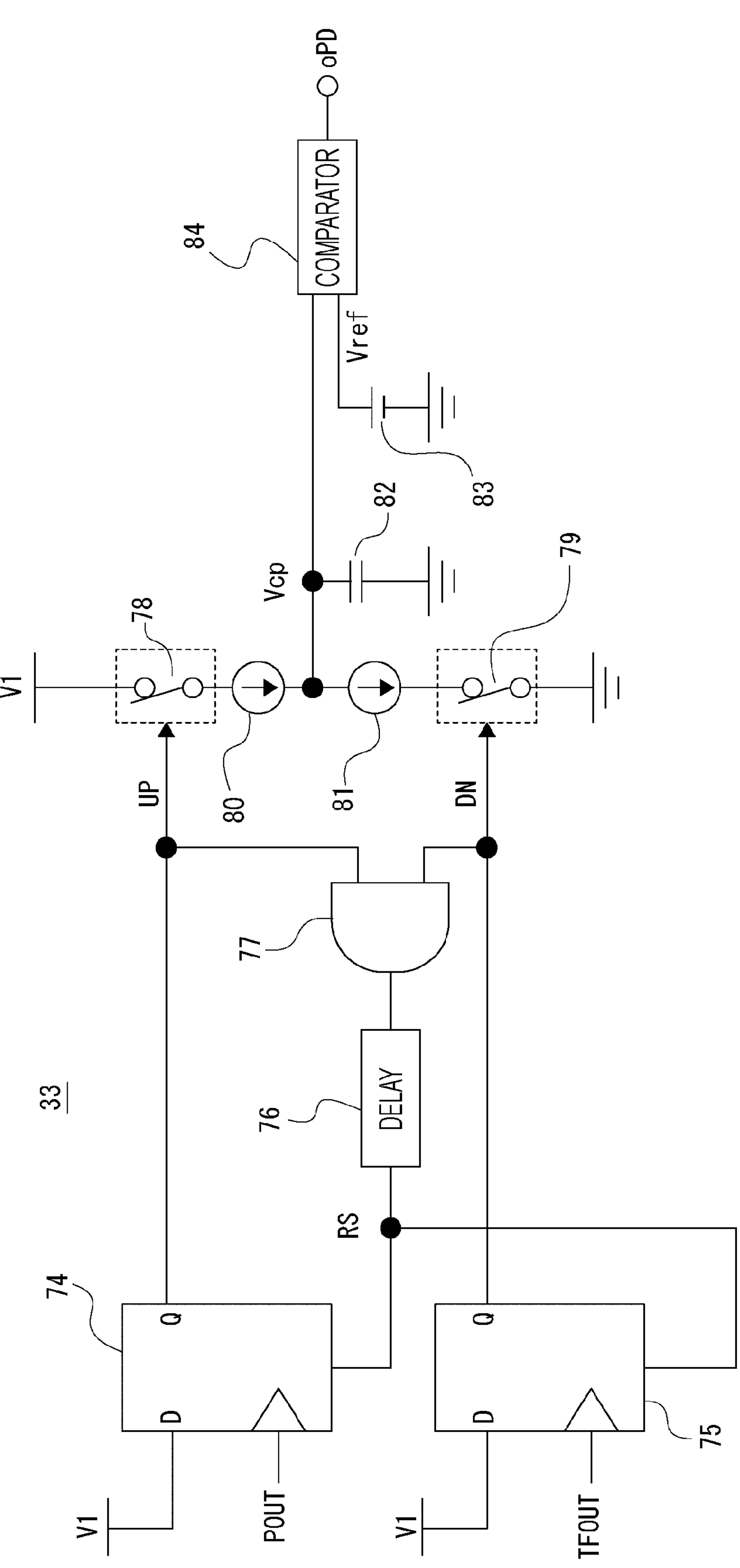
FIG. 12 is an explanatory diagram of a configuration example of the phase detection unit of the embodiment.
Figure 13:
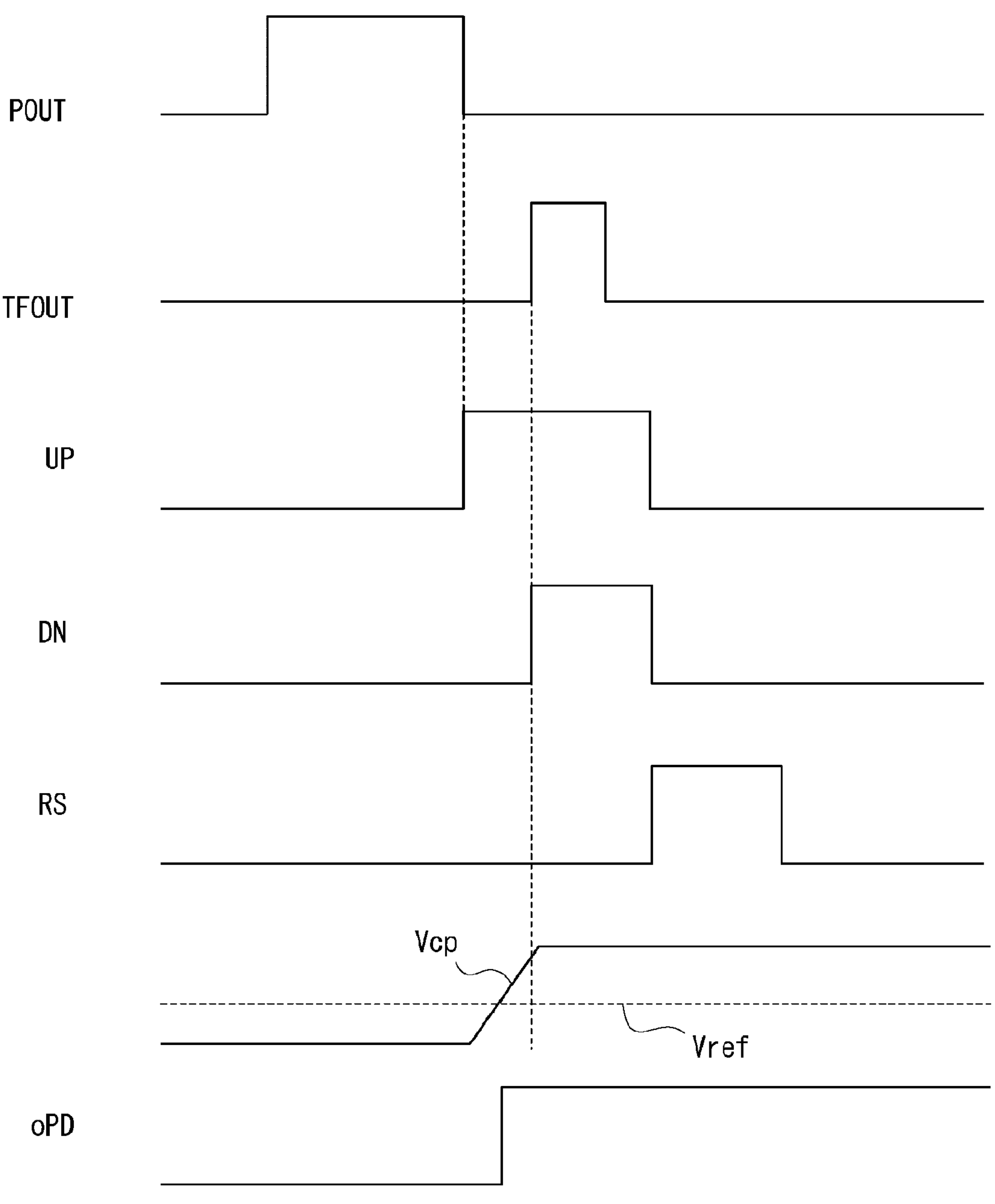
FIG. 13 is an explanatory diagram of operation waveforms of the phase detection unit of the embodiment.

FIG. 12 illustrates still another example of the phase detection unit 33. FIG. 13 illustrates signal waveforms of the respective units.

In this case, a drive control signal POUT is used as a clock input of a flip-flop 74, and an assist control signal TFOUT is used as a clock input of a flip-flop 75.

A fixed voltage (for example, voltage V1) is applied to D inputs of the flip-flops 74 and 75.

A Q output of the flip-flop 74 is set as an up signal UP, and a Q output of the flip-flop 75 is set as a down signal DN.

The up signal UP and the down signal DN are input to an AND gate 77, and an AND output thereof is delayed by a delay circuit 76, so that a reset signal RS is generated and supplied to the flip-flops 74 and 75.

By the up signal UP, a charge side switch 78 is turned on/off.

When the charge side switch 78 is turned on, a capacitor 82 is charged by a current flowing by a current source 80, and a voltage Vcp at one end of the capacitor 82 increases.

By the down signal DN, a discharge side switch 79 is turned on/off.

When the discharge side switch 79 is turned on, a discharge current flows from the capacitor 82 to a ground by a current source 81.

The voltage Vcp is input to a comparator 84 and is compared with a reference voltage Vref by a voltage source 83. Then, an output of the comparator 84 is used as a phase comparison signal oPD.

As illustrated in FIG. 13, for example, the flip-flop 74 outputs the up signal UP with falling of the drive control signal POUT as a trigger. Furthermore, the flip-flop 75 outputs the down signal DN with rising of the assist control signal TFOUT as a trigger.

Since a logical product of the up signal UP and the down signal DN is delayed to obtain the reset signal RS, the capacitor 82 is charged during a period of a difference between rising timings of the up signal UP and the down signal DN. Therefore, when a voltage serving as a reference of a phase error is determined as the reference voltage Vref with respect to the voltage Vcp corresponding to the timing difference, and the comparison result is set as the phase comparison signal oPD, the phase comparison signal oPD becomes a signal that detects a phase difference between the drive control signal POUT and the assist control signal TFOUT.

The delay time adjustment can be performed also by such a phase detection unit 33.

7. Laser Driving and Chip Structure

Subsequently, an example of laser driving and a chip structure will be described. First, a configuration example in which a plurality of the light emitting elements 40 is driven will be described.

Figure 14:
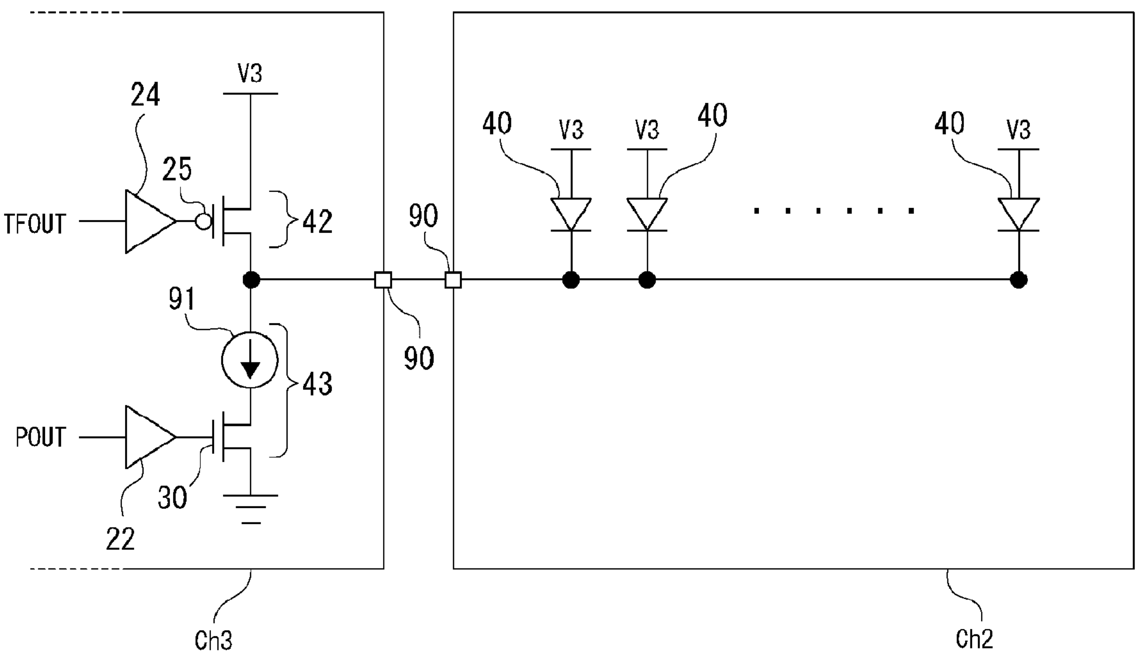
FIG. 14 is an explanatory diagram of a configuration example of driving of a plurality of lasers of the embodiment.

FIG. 14 illustrates a configuration example of driving of the plurality of light emitting elements 40 by one drive circuit 43.

Note that, in each of the following drawings, a laser driver chip Ch3 on which the laser drive device 41 is arranged and a chip (referred to as a "VCSEL chip" for description) Ch2 on which the light emitting elements 40 are arranged are illustrated. Terminals 90 indicate connection terminals provided in the laser driver chip Ch3 and the VCSEL chip Ch2.

In the laser driver chip Ch3, only a part of the configuration of each of the embodiments described above is illustrated.

That is, the assist transistor 25 and the buffer amplifier 24 are illustrated as the assist circuit 42, and the drive transistor 30, the buffer amplifier 22, and a current source 91 are illustrated as the drive circuit 43. The current source 91 represents the transistor 29 (or a current mirror circuit including the transistor 29).

In the configuration of FIG. 14, the plurality of light emitting elements 40 is driven to emit light by one drive circuit 43. The assist transistor 25 is connected in parallel with each of the plurality of light emitting elements 40.

In this case, timing adjustment of the drive control signal POUT and the assist control signal TFOUT can be performed as described in the embodiments described above.

Figure 15:
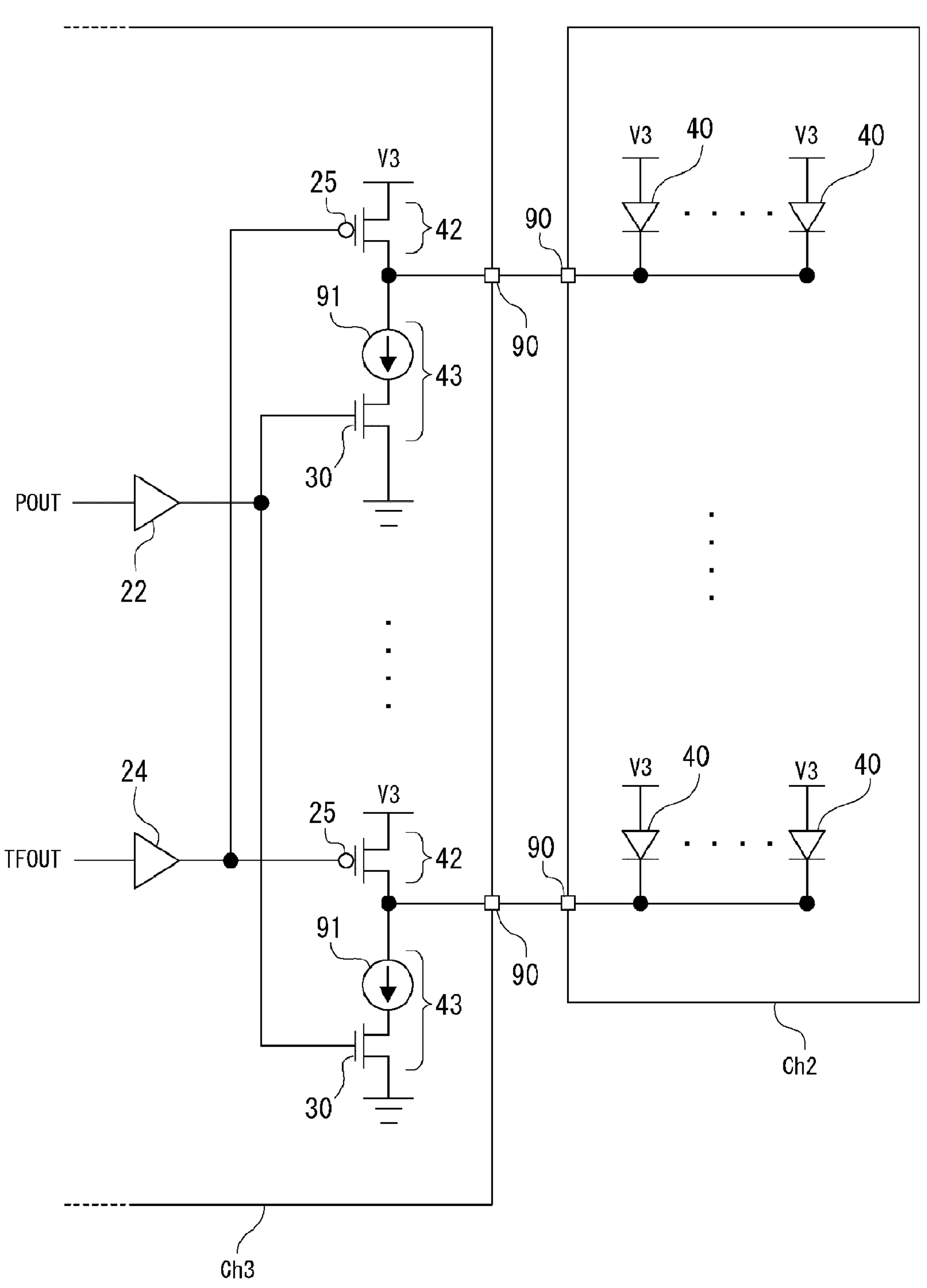
FIG. 15 is an explanatory diagram of a configuration example of driving of a plurality of lasers of the embodiment.

FIG. 15 illustrates a configuration example in which a plurality of the light emitting elements 40 is driven by one drive circuit 43, and a plurality of the configurations is provided.

The drive control signal POUT is branched at an output stage of the buffer amplifier 22 and supplied to gates of a plurality of the drive transistors 30.

Furthermore, the assist control signal TFOUT is branched at an output stage of the buffer amplifier 24 and supplied to gates of a plurality of the assist transistors 25.

Then, the plurality of light emitting elements 40 is driven to emit light by one drive circuit 43, and the assist transistor 25 corresponding to the drive circuit 43 is connected in parallel with each of the plurality of light emitting elements 40.

Figure 16:
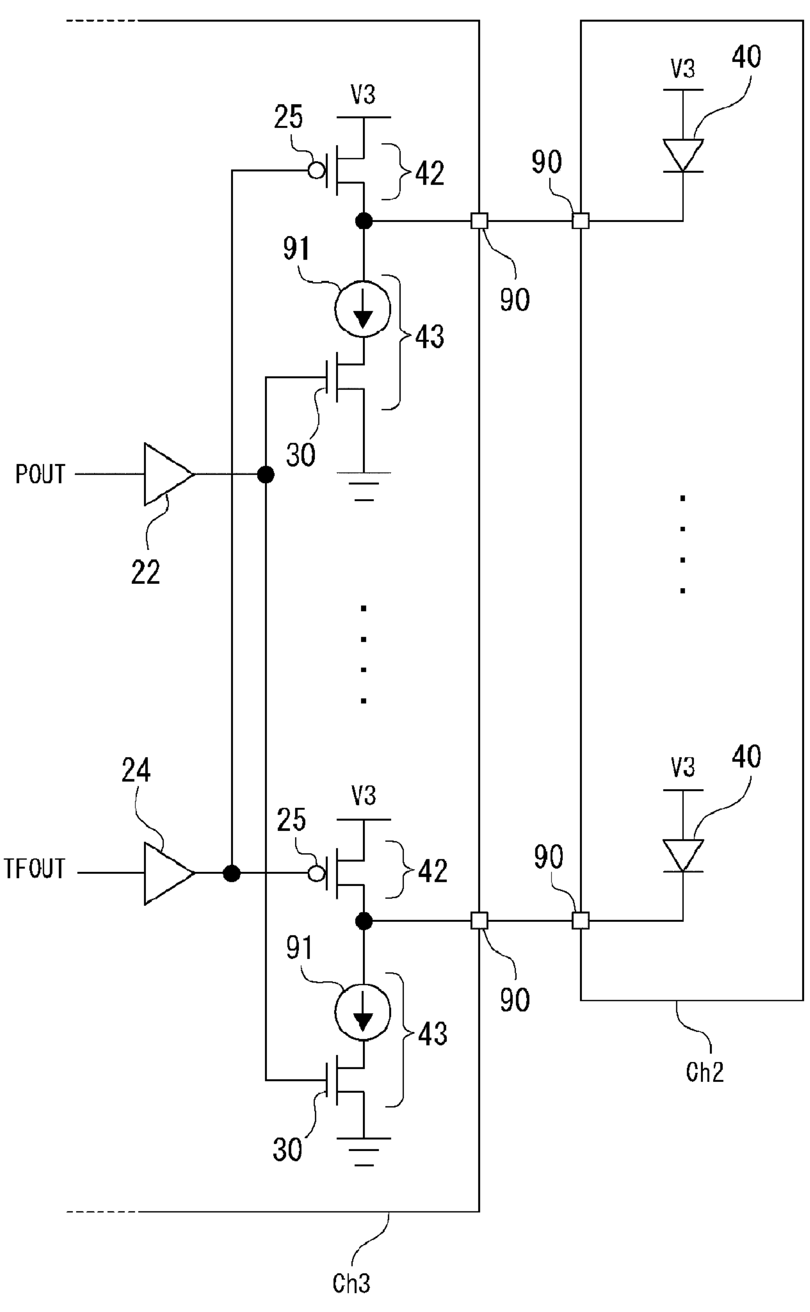
FIG. 16 is an explanatory diagram of a configuration example of driving of a plurality of lasers of the embodiment.

FIG. 16 illustrates a configuration example in which one light emitting element 40 is driven by one drive circuit 43, and a plurality of the configurations is provided.

The drive control signal POUT is branched at an output stage of the buffer amplifier 22 and supplied to gates of a plurality of the drive transistors 30.

Furthermore, the assist control signal TFOUT is branched at an output stage of the buffer amplifier 24 and supplied to gates of a plurality of the assist transistors 25.

Then, one light emitting element 40 is driven to emit light by one drive circuit 43, and the assist transistor 25 corresponding to the drive circuit 43 is connected in parallel with the light emitting element 40.

Figure 17:
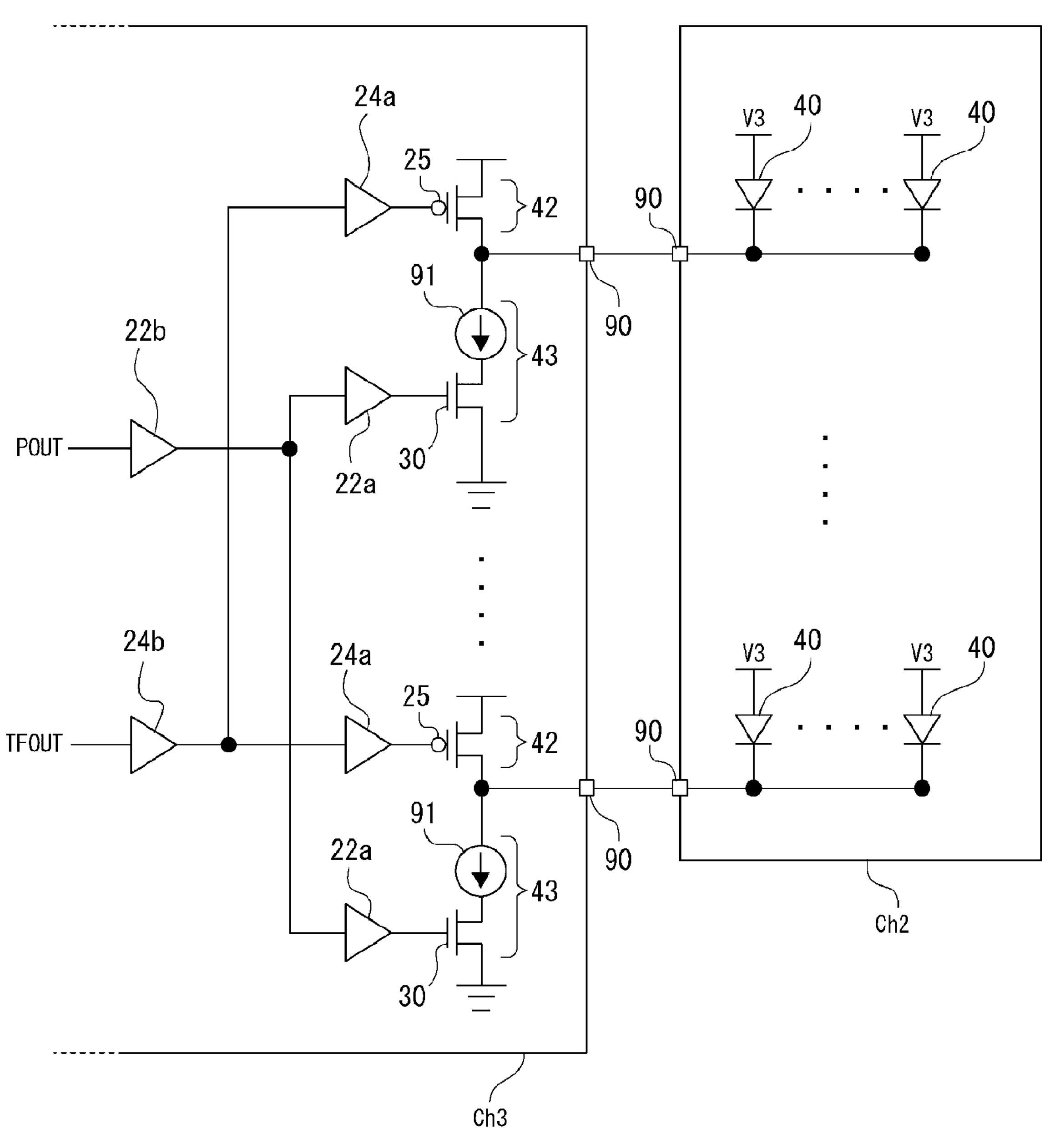
FIG. 17 is an explanatory diagram of a configuration example of driving of a plurality of lasers of the embodiment.

FIG. 17 illustrates an example in which a buffer configuration is multistaged.

The drive control signal POUT is branched into a plurality of systems at an output stage of a buffer amplifier 22*b*, and the systems are supplied to gates of a plurality of the drive transistors 30 via buffer amplifiers 22*a*.

The assist control signal TFOUT is branched into a plurality of systems at an output stage of a buffer amplifier 24*b*, and the systems are supplied to gates of a plurality of the assist transistor 25 via buffer amplifiers 24*a*.

Then, a plurality of the light emitting elements 40 is driven to emit light by one drive circuit 43, and the assist transistor 25 corresponding to the drive circuit 43 is connected in parallel with the plurality of light emitting elements 40.

For example, there are cases where the plurality of light emitting elements 40 is driven with the configuration as in each example described above. In these cases, the timing adjustment of the drive control signal POUT and the assist control signal TFOUT may be performed for all of the plurality of output stages, or the timing adjustment may be collectively performed in a unit in which the systems are bundled.

Figure 18:
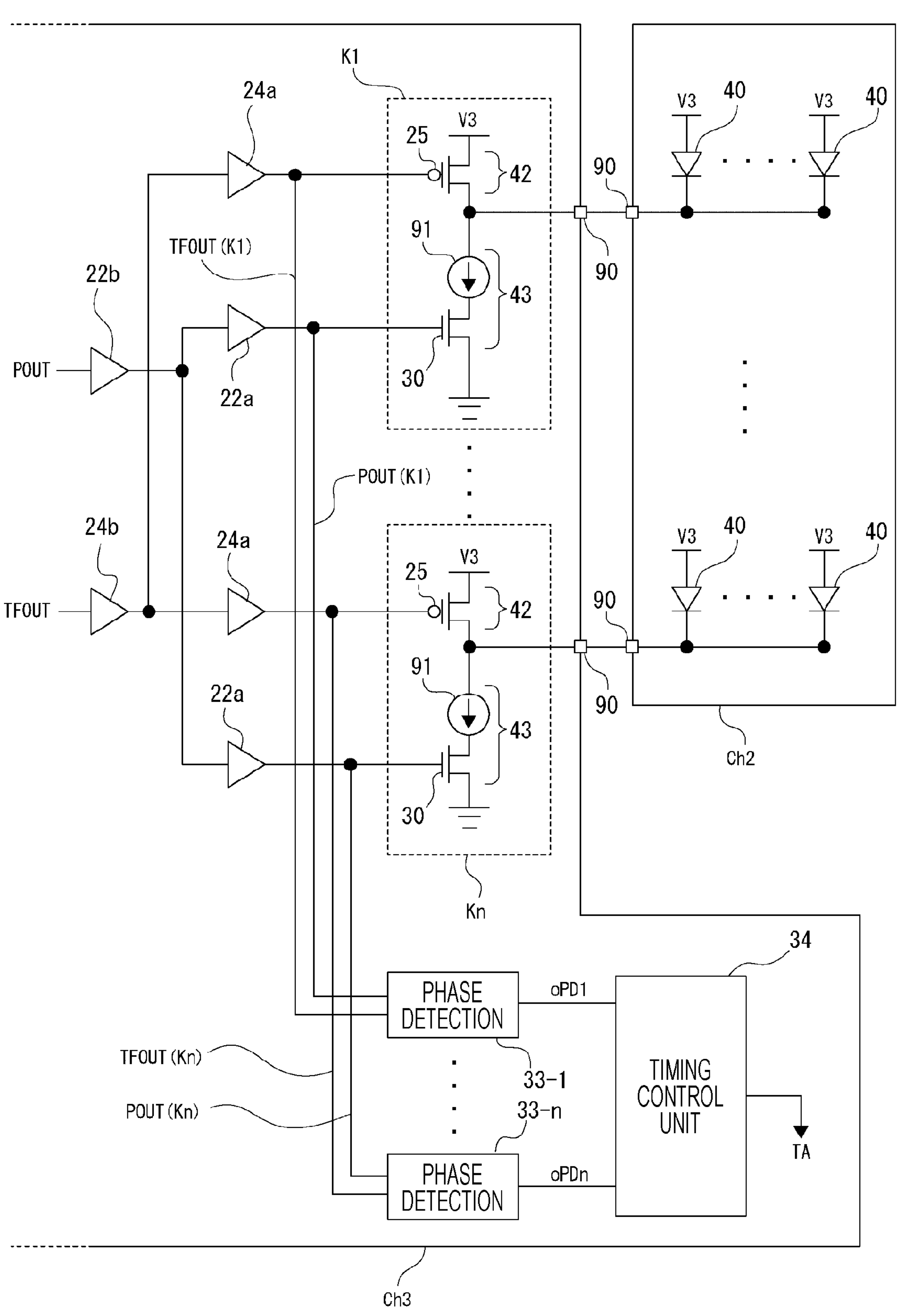
FIG. 18 is an explanatory diagram of a configuration example of driving of a plurality of lasers of the embodiment.

For example, FIG. 18 is a configuration example in a case where the timing adjustment for all of the plurality of output stages is performed.

FIG. 18 illustrates an example in which, in the configuration similar to that of FIG. 17, a first drive unit K1 to n-th drive unit Kn are configured when a set of the drive transistor 30, the current source 91, and the assist transistor 25 is considered as one drive unit.

A phase detection unit 33-1 is provided for the first drive unit K1. An assist control signal TFOUT (K1) of the gate node of the assist transistor 25 and a drive control signal POUT (K1) of the gate node of the drive transistor 30 of the first drive unit K1 are supplied to the phase detection unit 33-1, and phase comparison is performed.

A phase detection unit 33-*n* is provided for the n-th drive unit Kn. An assist control signal TFOUT (Kn) of the gate node of the assist transistor 25 and a drive control signal POUT (Kn) of the gate node of the drive transistor 30 of the n-th drive unit K1 are supplied to the phase detection unit 33-*n*, and phase comparison is performed.

The timing control unit 34 generates a timing adjustment signal TA on the basis of phase comparison signals oPD1, . . . oPDn from the phase detection unit 33-1 to the phase detection unit 33-*n*.

Figure 19:
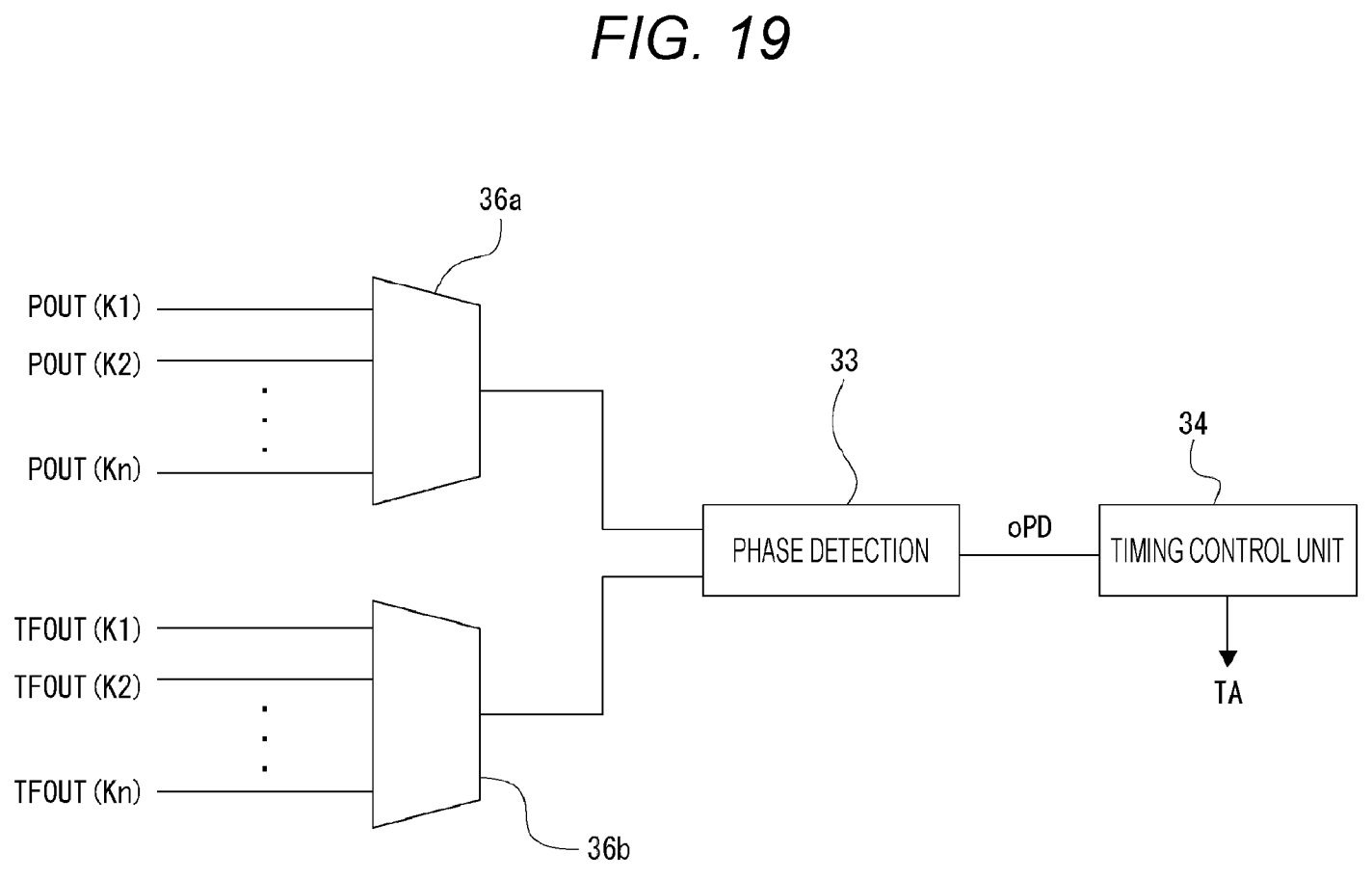

Furthermore, in a case where the plurality of drive units K1 . . . Kn is considered as illustrated in FIG. 18, one phase detection unit 33 may be used in a time division manner as illustrated in FIG. 19.

That is, selectors 36*a* and 36*b* are provided.

The selector 36*a* receives from the assist control signal TFOUT (K1) of the first drive unit K1 to the assist control signal TFOUT (Kn) of the n-th drive unit Kn.

The selector 36*b* receives from the drive control signal POUT (K1) of the first drive unit K1 to the drive control signal POUT (Kn) of the n-th drive unit Kn.

The selectors 36*a* and 36*b* perform switching in synchronization, and output the assist control signal TFOUT and the drive control signal POUT of the same unit to the phase detection unit 33 in the same period. The timing control unit 34 generates the timing adjustment signal TA on the basis of the phase comparison signal oPD of each period.

In this way, the timing adjustment for each drive unit can also be performed.

Figure 20:
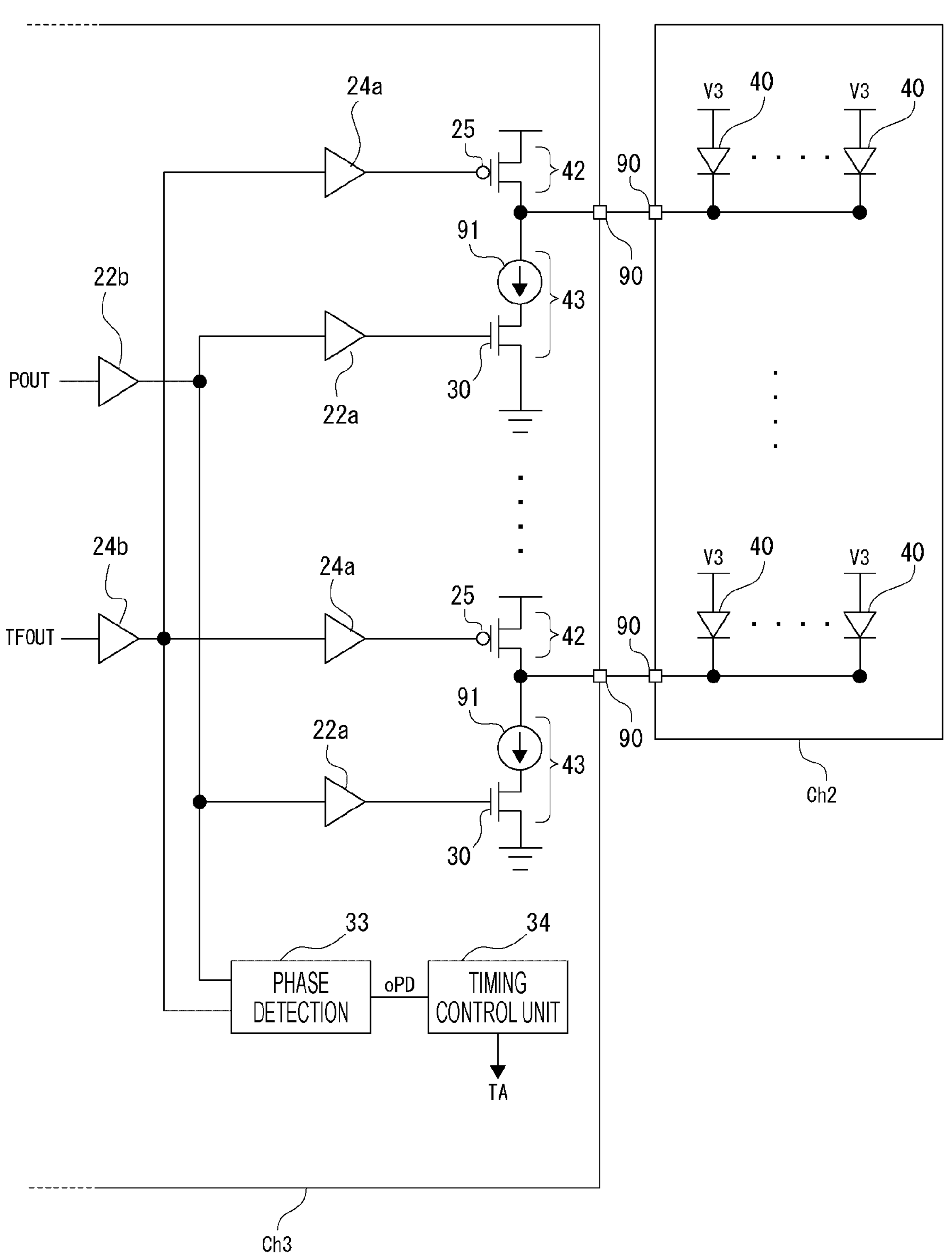
FIG. 20 is an explanatory diagram of a configuration example of driving of a plurality of lasers of the embodiment.

FIG. 20 illustrates an example in which the timing adjustment is collectively performed in a unit in which the systems are bundled.

The drive control signal POUT is branched into a plurality of systems at the output stage of the buffer amplifier 22*b*, and the systems are supplied to the gates of the drive transistors 30 via the buffer amplifiers 22*a*. In this case, the phase of the drive control signal POUT is extracted from the output stage of the buffer amplifier 22*b*, which is a branch point, and is supplied also to the detection unit 33.

The assist control signal TFOUT is branched into a plurality of systems at the output stage of the buffer amplifier 24*b*, and the systems are supplied to the gates of the assist transistor 25 via the buffer amplifiers 24*a*. In this case, the assist control signal TFOUT at the output stage of the buffer amplifier 24*b*, which is a branch point, is supplied also to the phase detection unit 33.

Then, the timing control unit 34 generates the timing adjustment signal TA on the basis of the phase comparison signal oPD by the phase detection unit 33.

In this way, the timing adjustment can be collectively performed for each drive unit.

Subsequently, arrangement examples of the laser driver chip Ch3 and the VCSEL chip Ch2 will be described.

Figures 21A, 21B:
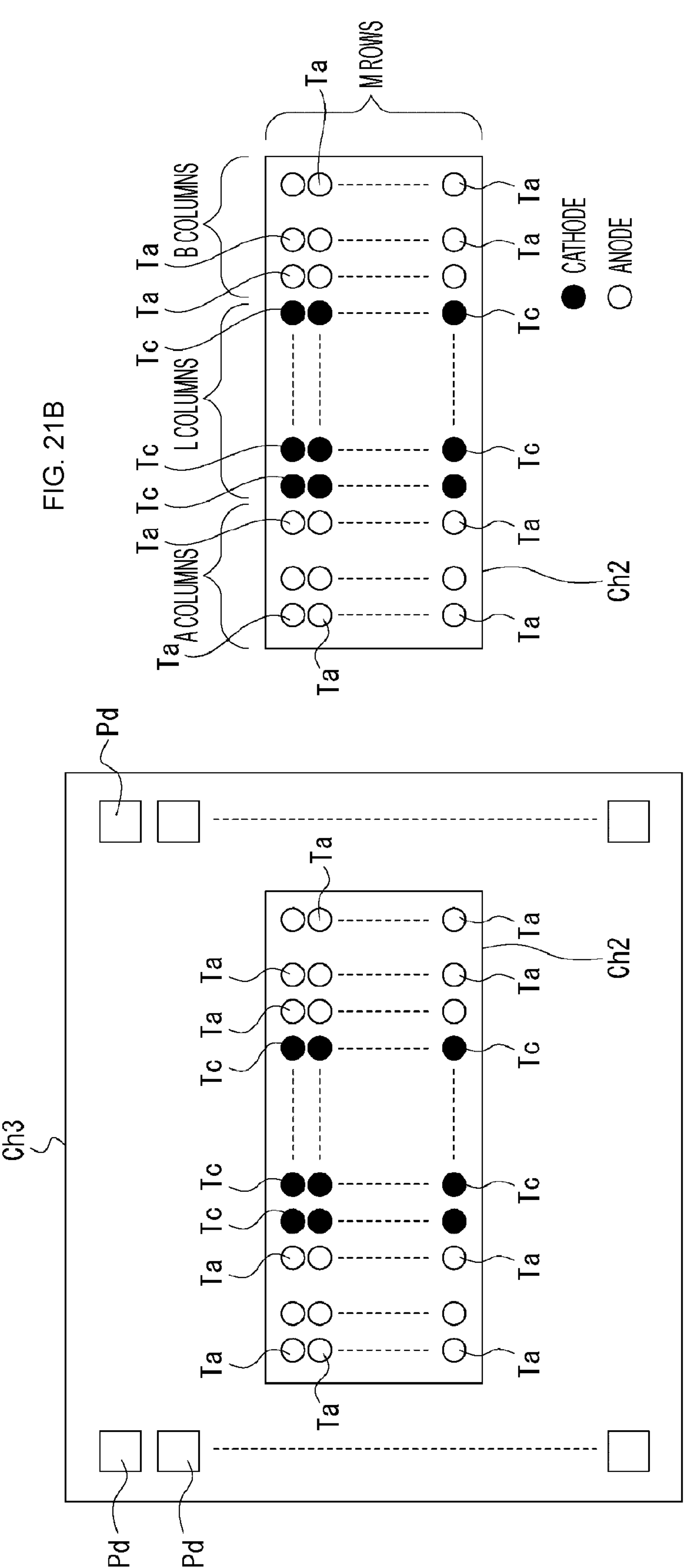
FIGS. 21A and 21B are explanatory diagrams of a laser driver chip and a VCSEL chip of the embodiment.

FIGS. 21A and 21B are diagrams for describing a terminal arrangement example in a semiconductor chip as the light emission unit 2. Note that the laser driver chip Ch3 is a semiconductor chip constituting the drive unit 3 including the laser drive device 41, and the VCSEL chip Ch2 is a semiconductor chip forming the light emission unit 2.

As illustrated in FIG. 21A, the VCSEL chip Ch2 can be mounted on the laser driver chip Ch3.

In this example, the cathode of the light emitting element 40 is connected to the drive circuit 43, and the anode of the light emitting element 40 is common (the anode of each light emitting element 40 is connected to the common power supply voltage V3). FIGS. 21A and 21B illustrate arrangement examples of cathode terminals Tc and anode terminals Ta of the light emitting element 40 in the VCSEL chip Ch2 corresponding to the case where the anode is common in this way, in which all the cathode terminals Tc are arranged in a central portion in an in-plane direction of the VCSEL chip Ch2, and arrangement regions of the cathode terminals Tc are secured outside an arrangement region of the anode terminals Ta.

As a specific arrangement example, as illustrated in FIG. 21B, the arrangement region of the cathode terminals Tc is secured in the central portion in a longitudinal direction of the VCSEL chip Ch2, and the arrangement regions of the anode terminals Ta are secured on both sides thereof.

In each arrangement region of the anode terminals Ta and the cathode terminals Tc, the terminals are arrayed two-dimensionally in a row direction and a column direction, and the number of rows of the terminals is made equal to M rows (M is a natural number of 2 or more) in each arrangement region. In FIG. 21B, the numbers of terminal arrays in the column direction in each arrangement region are represented by A, L, and B (A, L, and B are all natural numbers of 2 or more). The numbers of A, L, and B may be all the same or all different. Alternatively, at least only a part thereof may be different.

Note that FIG. 21A illustrates an example in which a plurality of electrode pads Pd is arrayed at both ends of the chip as an arrangement example of the electrode pads Pd included in the laser driver chip Ch3.

FIGS. 22A, 22B, 22C, and 22D illustrate a variation of light emission in an example in which the light emitting elements 40 are arranged as illustrated in FIG. 21B, for example. FIGS. 22A, 22B, 22C, and 22D also illustrate the light emitting elements 40 as cathode terminals Tc and anode terminals Ta. The light emitting elements 40, which are the cathode terminals Tc surrounded by a broken line LA, are the light emitting elements 40 that are caused to simultaneously emit light at a certain time point.

Figure 22A:
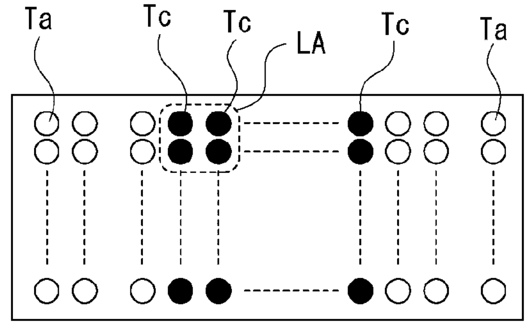
FIGS. 22A, 22B, 22C, and 22D are explanatory diagrams of light emission operation of the VCSEL chip of the embodiment.
Figure 22B:
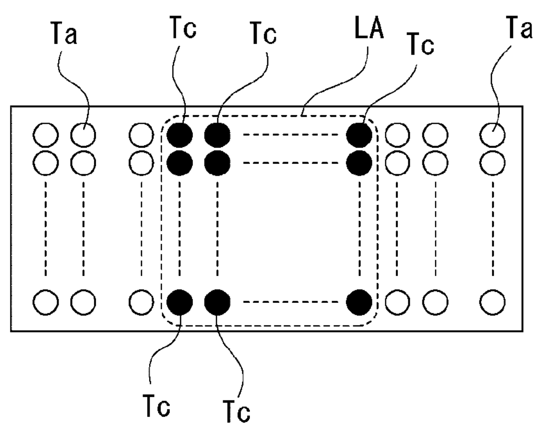

FIG. 22A illustrates an example in which a part (or one) of the light emitting elements 40 is caused to emit light at a certain timing, and FIG. 22B illustrates an example in which all the light emitting elements 40 are caused to simultaneously emit light.

Figure 22C:
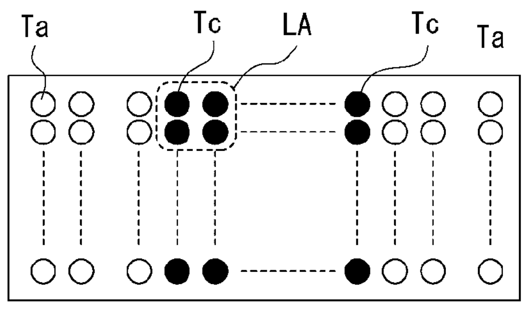
Figure 22D:
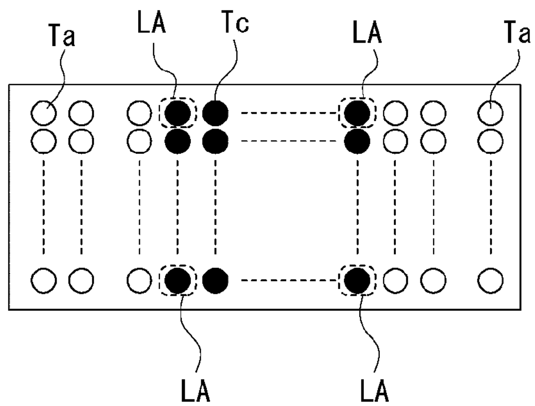

FIG. 22C illustrates an example in which a plurality of the light emitting elements 40 collectively arranged as a region is caused to emit light, and FIG. 22D illustrates an example in which a plurality of the light emitting elements 40 discretely arranged is caused to emit light.

In this way, various examples of the light emitting elements 40 that are caused to simultaneously emit light are assumed.

Figure 23:
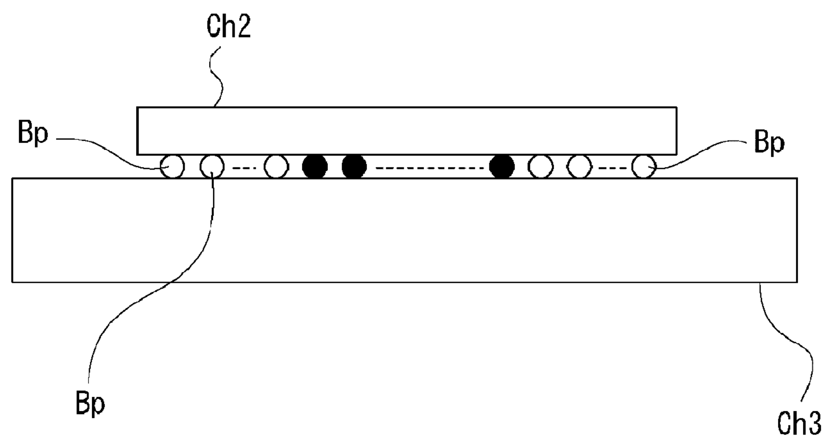
FIG. 23 is an explanatory diagram of lamination of the laser driver chip and the VCSEL chip of the embodiment.

FIG. 23 illustrates an example of mounting the VCSEL chip Ch2 on the laser driver chip Ch3. That is, flip-chip mounting using microbumps Bp (for example, solder bumps) as illustrated in the drawing can be performed.

Figure 24:
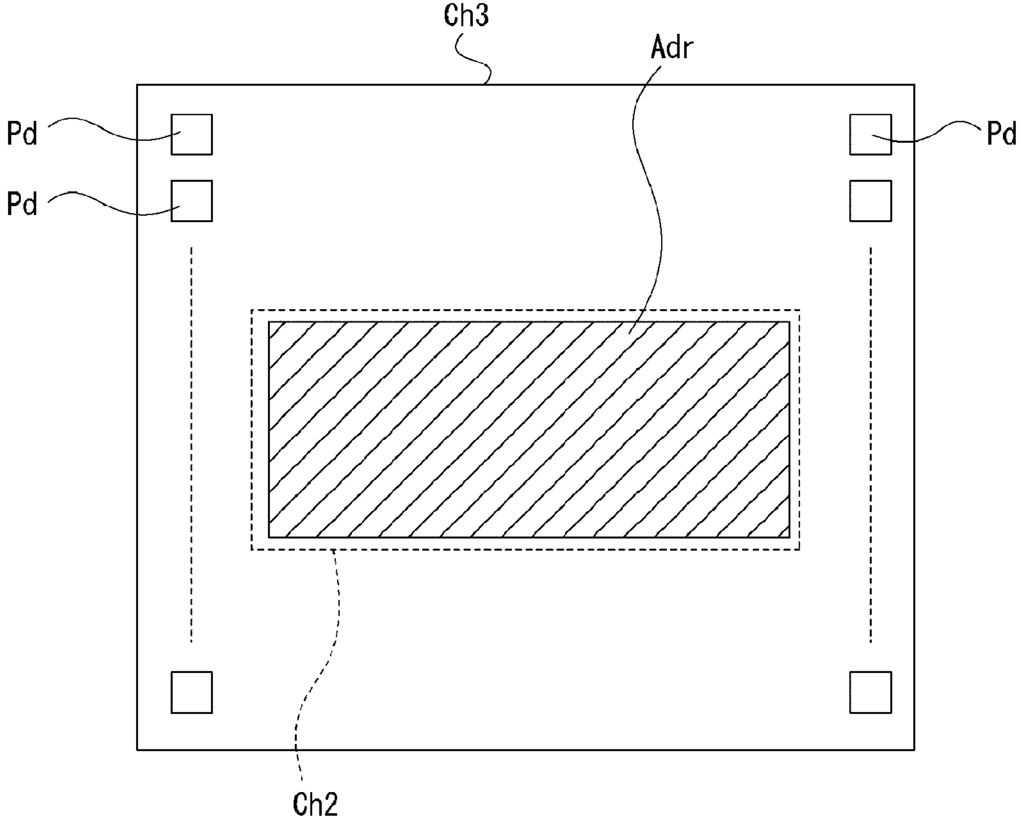
FIG. 24 is an explanatory diagram of a circuit arrangement immediately below the VCSEL chip of the embodiment.

FIG. 24 illustrates a region Adr in a chip in-plane direction on the laser driver chip Ch3, and illustrates an arrangement position of the VCSEL chip Ch2 by a broken line.

It is conceivable to arrange the assist circuit 42 in this region Adr. For example, a hatched portion HA in FIG. 8 is arranged in the region Adr in the laser driver chip Ch3.

Note that, here, it is assumed that the laser drive device 41 includes a plurality of sets of the assist circuit 42 and the drive circuit 43, and the light emission unit 2 also includes a plurality of the light emitting elements 40.

In this case, in a state where the VCSEL chip Ch2 is mounted on the laser driver chip Ch3, a position in the chip in-plane direction of the region Adr in which the assist circuit 42 is formed in the laser driver chip Ch3 and a position in the chip in-plane direction of a formation region of the light emitting element 40 in the VCSEL chip Ch2 overlap each other.

Specifically, at least a part of the region Adr is positioned immediately below the light emitting element 40. With this configuration, the assist circuit 42 can be arranged close to the light emitting element 40, and a wiring length from the assist circuit 42 to the light emitting element 40 can be shortened. That is, wiring resistance from the assist circuit 42 to the light emitting element 40 can be suppressed, which is suitable for fall assist.

Particularly, in a case where pulse light emission is performed by the direct ToF method, since heat rise of the light emitting element 40 is relatively suppressed, even if the assist circuit 42 is arranged close to the light emitting element 40, the assist circuit 42 is hardly adversely affected by the heat rise.

Note that the drive circuit 43 may be arranged in the region Adr. With this configuration, wiring resistance from the drive circuit 43 to the light emitting element 40 can also be suppressed, and accuracy of a pulse width can be improved.

FIGS. 25A, 25B, 250, and 25D illustrate a variation of a driving method of the light emitting element 40.

Figure 25A:
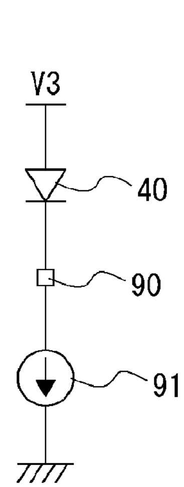
FIGS. 25A, 25B, 25C, and 25D are explanatory diagrams of a cathode drive and an anode drive of the embodiment.

FIG. 25A illustrates an example of a cathode drive method in which the current source 91 exists on the cathode side of the light emitting element 40.

Figure 25B:
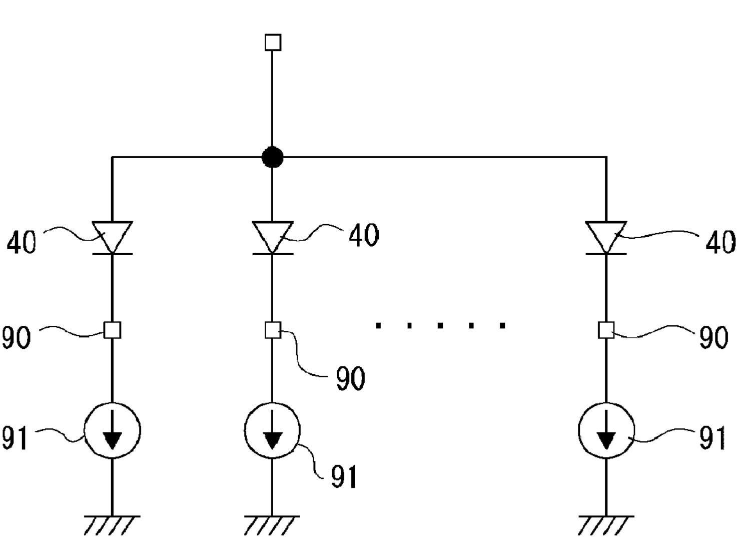

FIG. 25B illustrates an example in which each of the plurality of light emitting elements 40 is driven by the cathode drive method.

Figure 25C:
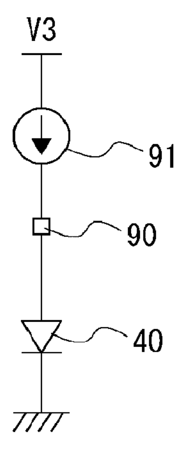

FIG. 25C illustrates an example of an anode drive method in which the current source 91 exists on the anode side of the light emitting element 40.

Figure 25D:
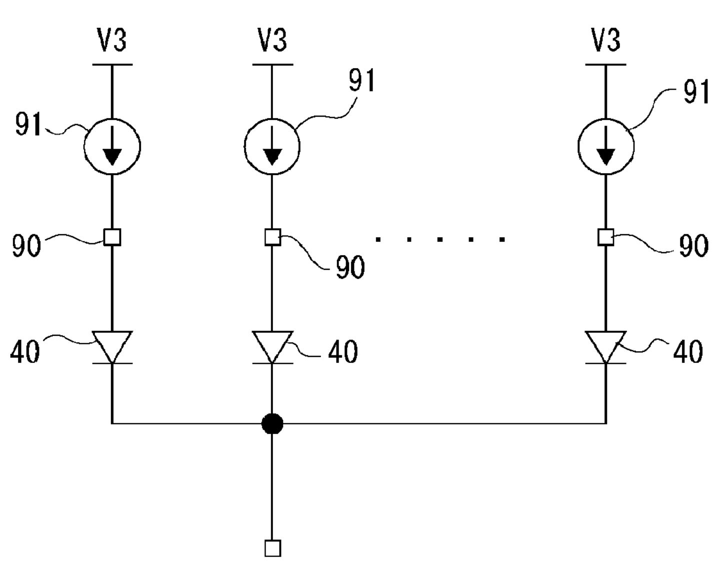

FIG. 25D illustrates an example in which each of the plurality of light emitting elements 40 is driven by the anode drive method.

The technology of the embodiments described above can be applied to any of these driving methods.

8. Conclusion and Modifications

In the above embodiments, the following effects can be obtained.

The laser drive device 41 of the first to fourth embodiments includes the drive circuit 43 that drives the light emitting element 40 as the VCSEL to emit light on the basis of the drive control signal POUT, and the assist circuit 42 that short-circuits both ends of the light emitting element 40 on the basis of the assist control signal TFOUT. Furthermore, the laser drive device 41 includes the timing adjustment unit 20 that performs mutual timing adjustment between the drive control signal POUT and the assist control signal TFOUT on the basis of the timing adjustment signal TA (or TA1, TA2), the phase detection unit 33 that detects a phase difference between the drive control signal POUT and the assist control signal TFOUT, and the timing control unit 34 that generates the timing adjustment signal TA on the basis of the phase comparison signal oPD that is a phase difference detection result of the phase detection unit 33.

That is, the timing adjustment of the assist control signal TFOUT and the drive control signal POUT is performed according to the phase difference detection result.

With this configuration, it is possible to eliminate deviation of timing due to environmental conditions, design conditions, aging conditions, and the like, and it is possible to reliably cause the assist circuit 42 to function to speed up a fall time. Moreover, with this configuration, distance measurement performance can be improved as the distance measurement apparatus 1.

In the first to fourth embodiments, the timing control unit 34 generates the timing adjustment signal TA (or TA1, TA2) on the basis of the phase difference detection result of the phase detection unit 33 continuously, periodically, or at a timing of detecting a predetermined adjustment trigger, and causes the timing adjustment unit 20 to execute timing adjustment.

For example, after an actual distance measurement operation is performed as the distance measurement apparatus 1, adjustment is performed continuously, periodically, or with a predetermined adjustment trigger, whereby appropriate timing adjustment according to a change in a distance measurement environment such as temperature in the distance measurement environment, a variation in the power supply voltage, or the like is implemented.

Note that it is also conceivable that the timing adjustment operation is not performed continuously or periodically, and is performed, for example, at a time before factory shipment.

In the first and second embodiments, the drive control signal POUT is supplied to the drive transistor 30 of the drive circuit 43 as a pulse signal of the first voltage V1, and the assist control signal TFOUT is supplied to the assist transistor 25 of the assist circuit 42 as a pulse signal of the voltage V3 higher than the first voltage V1. Then, the phase detection unit 33 performs phase comparison between the drive control signal POUT extracted from the gate node of the drive transistor 30 and the assist control signal TFOUT extracted from the gate node of the assist transistor 25 and level-shifted to the first voltage V1 (see FIGS. 2 and 6).

By comparing the phases of the drive control signal POUT at the gate node of the drive transistor 30 and the assist control signal TFOUT at the gate node of the assist transistor 25, delay so far is covered, and a timing error can be detected most appropriately. Therefore, timing adjustment accuracy can be improved.

Furthermore, in this case, the phase comparison in the phase detection unit 33 can be appropriately executed by matching a voltage level of the assist control signal TFOUT with the voltage V1.

In the third and fourth embodiments, an example has been described in which the phase detection unit 33 performs phase comparison between the drive control signal POUT and the assist control signal TFOUT extracted from other than the gate node of the assist transistor 25 and level-shifted to the first voltage V1.

For example, the assist control signal TFOUT for phase comparison is extracted from the input stage of the buffer amplifier 24, or the like, which applies a voltage to the gate node of the assist transistor 25 (see FIGS. 8 and 9).

By extracting the drive control signal POUT and the assist control signal TFOUT for phase comparison from other than the gate nodes, wiring can be simplified. For example, as illustrated in FIG. 20, in a case where the assist control signal TFOUT is branched into the plurality of assist transistors 25 at a preceding stage of the buffer amplifier 24*a*, the assist control signal TFOUT is extracted at the preceding stage of the buffer amplifier 24*a*, so that the wiring can be simplified and the phase comparison can be collectively performed.

Note that, by extraction from other than the gate node, the drive control signal POUT and the assist control signal TFOUT for phase comparison are slightly deviated from an actual light emission stop timing and assist start timing, which is slightly disadvantageous in terms of accuracy of timing error detection. On the other hand, by providing the buffer amplifiers 36 and 37 as illustrated in FIG. 8 and giving delay corresponding to the delay of the buffer amplifiers 24 and 22 to the drive control signal POUT and the assist control signal TFOUT for phase comparison, it is possible to perform timing error detection with higher accuracy.

In the third and fourth embodiments, an example has been described in which the phase detection unit 33 performs phase comparison between the drive control signal POUT extracted from other than the gate node of the drive transistor 30 and the assist control signal TFOUT. For example, the drive control signal POUT for phase comparison is extracted from the input stage of the buffer amplifier 22, or the like, which applies a voltage to the gate node of the drive transistor 30 (see FIGS. 8 and 9).

By extraction from other than the gate node, it is disadvantageous in terms of accuracy of timing error detection, but wiring can be simplified. For example, as illustrated in FIG. 20, in a case where the drive control signal POUT is branched into the plurality of drive transistors 30 at a preceding stage of the buffer amplifiers 22*a*, the drive control signal POUT is extracted at the preceding stage of the buffer amplifiers 22*a*, so that the wiring can be simplified and the phase comparison can be collectively performed.

As a matter of course, it is also conceivable that the assist control signal TFOUT is extracted from the input stage of the buffer amplifier 24 and the drive control signal POUT is extracted from the input stage of the buffer amplifier 22 as illustrated in FIGS. 8 and 9. Also from these, assuming the configuration of FIG. 20 particularly, effects of implementing collective comparison and simplifying wiring can be obtained.

In the embodiments, the timing adjustment unit 20 includes a first circuit that generates the drive control signal POUT from the input signal IN and includes the delay circuit, and a second circuit that generates the assist control signal TFOUT from the input signal IN.

For example, in FIG. 4, the first circuit is formed by the buffer amplifier 52 and the delay circuit 54, and the second circuit is formed by the delay circuit 50, the inverter 51, and the AND gate 53.

In addition, timing adjustment is performed by setting the delay time of the delay circuit 54 of the first circuit according to the timing adjustment signal TA.

By varying the delay time of the drive control signal POUT, the timing between the drive control signal POUT and the assist control signal TFOUT can be adjusted, whereby a fall time can be appropriately improved.

That is, since delay usually occurs in an assist control signal path, which is a side on which a transistor having a relatively thick film is used at a high voltage (V3), necessary timing adjustment can be performed only by performing the delay on the drive control signal path side.

In the second embodiment, the timing adjustment unit 20 includes a first circuit that generates the drive control signal POUT from the input signal IN and includes the delay circuit 54, and a second circuit that generates the assist control signal TFOUT from the input signal IN and includes the delay circuit 55. In addition, a configuration example has been described in which timing adjustment is performed by setting one or both of the delay time of the delay circuit 54 of the first circuit and the delay time of the delay circuit 55 of the second circuit according to the timing adjustment signals TA1 and TA2 (see FIG. 7).

Also by the configuration in which the delay circuit 54 can vary the delay time of the drive control signal POUT and the delay circuit 55 can vary the delay time of the assist control signal TFOUT, the timing between the drive control signal POUT and the assist control signal TFOUT can be adjusted, and the fall time can be improved.

Particularly, in the second embodiment, an example has been described in which the delay time of the delay circuit 54 of the first circuit is adjusted in an adjustment period that is a non-operation period, and then the delay time of the delay circuit 55 of the second circuit is variably adjusted in an actual operation period.

Varying the delay time of the drive control signal during an actual operation of laser emission drive as the distance measurement apparatus 1 causes a light emission timing for the input signal IN to vary during the actual operation. In some cases, distance measurement accuracy is affected. Thus, a delay amount is set on the drive control signal side as a calibration operation in the adjustment period. With this configuration, delay equivalent to or greater than that on the assist control signal side is given to the drive control signal. In this way, mutual timing adjustment becomes possible by the delay on the assist control signal side. Therefore, in the actual operation period, the delay amount is variably adjusted on the assist control signal side to perform mutual timing adjustment.

In this way, the drive control signal does not need to be changed during actual operation. That is, the light emission timing for the input signal IN can be fixed, and the distance measurement apparatus 1 can stably perform distance measurement without performing processing corresponding to a change in the light emission timing.

In the fourth embodiment, an example has been described in which the switch 45 that cuts off current supply to the assist circuit 42 and the light emitting element 40 is provided.

With this configuration, it is possible to have a function of stopping laser emission drive at the time of error detection or the like. For example, in a case where an amount of current is excessive or a state where a pulse width of the drive control signal is too long is detected, an abnormal operation can be stopped by turning off the switch.

The laser drive device 41 of each embodiment can drive the plurality of light emitting elements 40 (see FIGS. 14, 15, 16, 17, 18, and 20).

As illustrated in various ways in a case where a plurality of light emitting elements is driven by one drive circuit 43 (FIG. 14), in a case where there is a plurality of such sets (FIG. 15), in a case where one light emitting element is driven by one drive circuit 43 and there is a plurality of such units (FIG. 16), and the like, a configuration is assumed in which a plurality of light emitting elements is driven. In these cases, it is possible to perform laser emission drive with appropriate timing adjustment based on phase comparison.

The configuration as the sensing module of the embodiments includes the light emission unit 2 in which the plurality of light emitting elements 40 by the vertical cavity surface emitting laser is arrayed, the laser drive device 41 that drives the light emitting elements 40 of the light emission unit 2, and the light reception sensor 7 that receives and images light emitted from the light emission unit 2 and reflected by the subject.

In this case, since the laser drive device 41 has the configuration described in the embodiments, the fall time of the light emission driving current is improved, and the distance measurement performance can be improved.

Furthermore, an example has been described in which the VCSEL chip Ch2 on which the light emitting elements 40 are formed is arranged on the laser driver chip Ch3 on which the laser drive device 41 is formed (see FIGS. 21A, 21B, and 23).

As a so-called VCSEL on silicon structure, an efficient structure in which a wiring length is also short, for example, is achieved.

Furthermore, in the case of such a structure, it is difficult to adjust an assist timing while detecting a drive control signal (POUT/NCHIN), a drive current caused by the drive control signal, or the like outside the laser drive device 41. Thus, it is effective to perform timing adjustment based on phase comparison inside the laser drive device 41 as in the embodiments.

Furthermore, in the laser driver chip Ch3 on which the laser drive device 41 is formed, the assist circuit 42 is arranged at a position immediately below the VCSEL chip Ch2 (see FIGS. 8 and 24).

By placing the assist circuit 42 immediately below the light emitting element 40, a distance between the anode or cathode of the light emitting element 40 and the assist transistor 25 can be shortened, and wiring resistance can be reduced. This is advantageous for sharpening falling.

Note that, for example, it is assumed that the drive transistor 30 and the transistor 29 are also placed immediately below the light emitting element 40. The wiring length can be shortened, which is advantageous for sharpening a rising/falling waveform.

Such a structure is easily adopted in the direct TOF. This is because the light emission is short-pulse light emission and an average light emission current is small, so that heat generation of the light emitting element 40 is small, and there is little concern that the assist transistor 25 and the like are thermally affected.

Note that the effects described in the present specification are merely examples and are not limitative, and other effects may be achieved.

Note that the present technology can also include the following configurations.

(1)

A laser drive device including:

- a drive circuit that drives a light emitting element by a vertical cavity surface emitting laser to emit light on the basis of a drive control signal;
- an assist circuit that short-circuits both ends of the light emitting element on the basis of an assist control signal;
- a timing adjustment unit that performs mutual timing adjustment between the drive control signal and the assist control signal on the basis of a timing adjustment signal;
- a phase detection unit that detects a phase difference between the drive control signal and the assist control signal; and
- a timing control unit that generates the timing adjustment signal on the basis of a phase difference detection result of the phase detection unit.

(2)

The laser drive device according to (1), in which the timing control unit generates the timing adjustment signal on the basis of the phase difference detection result of the phase detection unit continuously, periodically, or at a timing of detecting a predetermined adjustment trigger, and causes the timing adjustment unit to execute timing adjustment.

(3)

The laser drive device according to (1) or (2), in which

- the drive control signal is supplied to a drive transistor of the drive circuit as a pulse signal of a first voltage,
- the assist control signal is supplied to an assist transistor of the assist circuit as a pulse signal having a voltage higher than the first voltage, and the phase detection unit performs phase comparison between the drive control signal extracted from a gate node of the drive transistor and the assist control signal extracted from a gate node of the assist transistor and level-shifted to the first voltage.

(4)

The laser drive device according to (1) or (2), in which

- the drive control signal is supplied to a drive transistor of the drive circuit as a pulse signal of a first voltage,
- the assist control signal is supplied to an assist transistor of the assist circuit as a pulse signal having a voltage higher than the first voltage, and the phase detection unit performs phase comparison between the drive control signal and the assist control signal extracted from other than a gate node of the assist transistor and level-shifted to the first voltage.

(5)

The laser drive device according to any one of (1), (2), and (4), in which

- the drive control signal is supplied to a drive transistor of the drive circuit as a pulse signal of a first voltage,
- the assist control signal is supplied to an assist transistor of the assist circuit as a pulse signal having a voltage higher than the first voltage, and the phase detection unit performs phase comparison between the drive control signal extracted from other than a gate node of the drive transistor and the assist control signal.

(6)

The laser drive device according to any one of (1) to (5), in which the timing adjustment unit includes:

- a first circuit that generates the drive control signal from an input signal and includes a delay circuit; and
- a second circuit that generates the assist control signal from the input signal, and performs timing adjustment by setting a delay time of the delay circuit according to the timing adjustment signal.

(7)

The laser drive device according to any one of (1) to (5), in which the timing adjustment unit includes:

- a first circuit that generates the drive control signal from an input signal and includes a delay circuit; and
- a second circuit that generates the assist control signal from the input signal and includes a delay circuit, and performs timing adjustment by setting one or both of a delay time of the delay circuit of the first circuit and a delay time of the delay circuit of the second circuit according to the timing adjustment signal.

(8)

The laser drive device according to (7), in which the delay time of the delay circuit of the first circuit is adjusted in an adjustment period that is a non-operation period, and then the delay time of the delay circuit of the second circuit is variably adjusted in an actual operation period.

(9)

The laser drive device according to any one of (1) to (8), further including a switch that cuts off current supply to the assist circuit and the light emitting element.

(10)

The laser drive device according to any one of (1) to (9), in which a plurality of the light emitting elements is driven.

(11)

A sensing module including:

a light emission unit in which a plurality of light emitting elements by a vertical cavity surface emitting laser is arrayed;

a laser drive device that drives the light emitting elements of the light emission unit; and a light reception sensor that receives and images light emitted from the light emission unit and reflected by a subject, in which the laser drive device includes:

a drive circuit that drives a light emitting element by a vertical cavity surface emitting laser to emit light on the basis of a drive control signal;

an assist circuit that short-circuits both ends of the light emitting element on the basis of an assist control signal to speed up a fall time of the light emitting element;

a timing adjustment unit that performs mutual timing adjustment between the drive control signal and the assist control signal on the basis of a timing adjustment signal;

a phase detection unit that detects a phase difference between the drive control signal and the assist control signal; and a timing control unit that generates the timing adjustment signal on the basis of a phase difference detection result of the phase detection unit.

(12)

The sensing module according to (11), in which a light emitting element chip on which the light emitting element is formed is arranged on a chip on which the laser drive device is formed.

(13)

The sensing module according to (12), in which the assist circuit is arranged at a position immediately below the light emitting element chip in the chip on which the laser drive device is formed.

(14)

A timing adjustment method of a laser drive device including a drive circuit that drives a light emitting element by a vertical cavity surface emitting laser to emit light on the basis of a drive control signal, and an assist circuit that short-circuits both ends of the light emitting element on the basis of an assist control signal, the timing adjustment method including:

detecting a phase difference between the drive control signal and the assist control signal;

generating a timing adjustment signal on the basis of a phase difference detection result; and performing mutual timing adjustment between the drive control signal and the assist control signal on the basis of the timing adjustment signal.

REFERENCE SIGNS LIST

1 Distance measurement apparatus
2 Light emission unit
3 Drive unit
4 Power supply circuit
5 Light emission side optical system
6 Light reception side optical system
7 Light reception sensor
8 Distance measurement unit
9 Control unit
20 Timing adjustment unit
21, 22, 24, 36, 37, 52 Buffer amplifier
23, 31 Level shifter
25 Assist transistor
27, 28, 29 Transistor
30 Drive transistor
32 Dummy circuit
33 Phase detection unit
34 Timing control unit
35 Adjustment operation control unit
40 Light emitting element
41 Laser drive device
42 Assist circuit
43 Drive circuit
45 Switch
50, 54, 55 Delay circuit

The invention claimed is:

1. A laser drive device, comprising:

a drive circuit configured to drive a candidate light emitting element of at least one light emitting element based on a drive control signal, wherein the candidate light emitting element of the at least one light emitting element comprises two ends, and the drive circuit comprises a drive transistor configured to receive the drive control signal as a first pulse signal of a first voltage;

an assist circuit configured to short-circuit the two ends of the candidate light emitting element of the at least one light emitting element based on an assist control signal, wherein the assist circuit comprises an assist transistor configured to receive the assist control signal as a second pulse signal having a second voltage, and the second voltage is higher than the first voltage;

a timing adjustment unit configured to mutually adjust timing of each signal of the drive control signal and the assist control signal based on a timing adjustment signal;

a phase detection unit configured to:

extract the assist control signal from a gate node of the assist transistor, wherein the assist control signal is level-shifted to the first voltage;

extract the drive control signal from a gate node of the drive transistor; and detect a phase difference between the drive control signal and the assist control signal; and a timing control unit configured to generate the timing adjustment signal based on the detected phase difference.

2. The laser drive device according to claim 1, wherein the timing control unit is further configured to:

generate the timing adjustment signal in one of a continuous manner, a periodic manner, or at a time of detection of an adjustment trigger.

3. The laser drive device according to claim 1, wherein the timing adjustment unit includes:

a first circuit configured to generate the drive control signal based on an input signal, wherein the first circuit includes a first delay circuit; and a second circuit configured to generate the assist control signal based on the input signal, and to mutually adjust the timing of each signal of the drive control signal and the assist control signal, the timing adjustment unit is further configured to set a delay time of the first delay circuit based on the timing adjustment signal.

4. The laser drive device according to claim 1, wherein the timing adjustment unit includes:

a first circuit configured to generate the drive control signal based on an input signal, wherein the first circuit includes a first delay circuit; and a second circuit configured to generate the assist control signal based on the input signal, wherein the second circuit includes a second delay circuit, and to mutually adjust the timing of each signal of the drive control signal and the assist control signal, the timing adjustment unit is further configured to set, at least one of a first delay time of the first delay circuit or a second delay time of the second delay circuit, based on the timing adjustment signal.

5. The laser drive device according to claim 4, wherein the timing adjustment unit is further configured to:

set the first delay time of the first delay circuit in a non-operation period of the laser drive device; and set the second delay time of the second delay circuit in an operation period of the laser drive device.

6. The laser drive device according to claim 1, further comprising a switch configured to cut off current supply to the assist circuit and the candidate light emitting element of the at least one light emitting element.

7. The laser drive device according to claim 1, wherein the at least one light emitting element includes a plurality of light emitting elements, and the drive circuit is further configured to drive each light emitting element of the plurality of light emitting elements.

8. A sensing module, comprising:

a light emission unit comprising a plurality of light emitting elements;

a laser drive device configured to drive at least one light emitting element of the plurality of light emitting elements of the light emission unit; and a light reception sensor configured to receive light emitted from the light emission unit and reflected by a subject, wherein the laser drive device includes:

a drive circuit configured to drive a candidate light emitting element of the at least one light emitting element based on a drive control signal, wherein the candidate light emitting element of the at least one light emitting element comprises two ends, and the drive circuit comprises a drive transistor configured to receive the drive control signal as a first pulse signal of a first voltage;

an assist circuit configured to short-circuit the two ends of the candidate light emitting element of the at least one light emitting element based on an assist control signal, wherein the assist circuit comprises an assist transistor configured to receive the assist control signal as a second pulse signal having a second voltage, and the second voltage is higher than the first voltage;

a timing adjustment unit configured to mutually adjust timing of each signal of the drive control signal and the assist control signal based on a timing adjustment signal;

a phase detection unit configured to:

extract the assist control signal from a gate node of the assist transistor, wherein the assist control signal is level-shifted to the first voltage;

extract the drive control signal from a gate node of the drive transistor; and detect a phase difference between the drive control signal and the assist control signal; and a timing control unit configured to generate the timing adjustment signal based on the detected phase difference.

9. The sensing module according to claim 8, further comprising:

a light emitting element chip and a laser drive chip, wherein the light emitting element chip is on the laser drive chip, the light emitting element chip comprises the plurality of light emitting elements, and the laser drive chip comprises the laser drive device.

10. The sensing module according to claim 9, wherein the assist circuit is at a position immediately below the light emitting element chip in the laser drive chip.

11. A timing adjustment method of a laser drive device, the timing adjustment method comprising:

extracting an assist control signal from a gate node of an assist transistor, wherein the assist control signal is level-shifted to a first voltage;

extracting a drive control signal from a gate node of a drive transistor; and detecting a phase difference between the drive control signal and the assist control signal, wherein the laser drive device includes:

a drive circuit configured to drive a light emitting element based on the drive control signal, an assist circuit configured to short-circuit both ends of the light emitting element based on the assist control signal, the drive circuit comprises the drive transistor configured to receive the drive control signal as a first pulse signal of the first voltage, and the assist circuit comprises the assist transistor configured to receive the assist control signal as a second pulse signal having a second voltage, and the second voltage is higher than the first voltage;

generating a timing adjustment signal based on the detected phase difference; and mutually adjusting timing of each signal of the drive control signal and the assist control signal based on the timing adjustment signal.

12. A laser drive device, comprising:

a drive circuit configured to drive a light emitting element based on a drive control signal, wherein the drive circuit comprises a drive transistor configured to receive the drive control signal as a first pulse signal of a first voltage, and the light emitting element comprises two ends;

an assist circuit configured to short-circuit the two ends of the light emitting element based on an assist control signal, wherein the assist circuit comprises an assist transistor configured to receive the assist control signal as a second pulse signal having a second voltage, and the second voltage is higher than the first voltage;

a timing adjustment unit configured to mutually adjust timing of each signal of the drive control signal and the assist control signal based on a timing adjustment signal;

a phase detection unit configured to:

extract the drive control signal from a gate node of the drive transistor;

extract the assist control signal from a gate node of the assist transistor, wherein the assist control signal is level-shifted to the first voltage; and detect a phase difference between the drive control signal and the assist control signal; and a timing control unit configured to generate the timing adjustment signal based on the detected phase difference.

* * * * *